United States Patent

Ishioka et al.

[11] Patent Number: 5,949,602
[45] Date of Patent: Sep. 7, 1999

[54] METHOD AND APPARATUS FOR MEASURING HEAD DEVIATION AND METHOD AND APPARATUS FOR RECORDING/REPRODUCING DATA

[75] Inventors: Hideaki Ishioka; Yoshikazu Onuki; Satoru Seko, all of Kanagawa; Toru Takeda, Saitama, all of Japan

[73] Assignee: Sony Corporation, Tokyo, Japan

[21] Appl. No.: 08/784,324

[22] Filed: Jan. 16, 1997

[30] Foreign Application Priority Data

Jan. 19, 1996 [JP] Japan .................................. 8-007844

[51] Int. Cl.$^6$ .................................................. G11B 5/596
[52] U.S. Cl. ........................ 360/75; 360/77.06; 360/78.14
[58] Field of Search .......................... 360/75, 69, 77.01, 360/77.03, 77.05, 77.06, 77.08, 77.11, 78.01, 78.05, 78.14; 369/44.27, 44.28, 44.34, 44.41

[56] References Cited

U.S. PATENT DOCUMENTS 5,617,388  4/1997  Ishioka et al. .......................... 369/4.28
5,703,846  12/1997  Saito et al. .......................... 369/44.34 X

*Primary Examiner*—Muhammad Edun
*Attorney, Agent, or Firm*—Limbach & Limbach L.L.P.

[57] ABSTRACT

A data for measuring deviation between a recording head and a playback head easily for correctly reproducing data despite such deviation. A playback signal amplitude detection circuit 23 detects the amplitude of playback signals of test data from a playback amplifier 15, while adders 51, 52 cumulatively sum the amplitude values of playback signals in a pre-set group of sectors and those in another pre-set sector of groups on a magnetic disc 21 supplied from the playback signal amplitude detection circuit 23. A subtractor 50 computes a difference between a first sum value from the adder 51 and a second sum value from the adder 52 and routes the difference to a controller 11. The controller detects deviation between the recording head and the playback head from the difference value. When recording or reproducing actual data, the controller 11 causes the position of the recording head or the playback head to be corrected on the basis of the detected deviation.

12 Claims, 14 Drawing Sheets

METHOD AND APPARATUS FOR MEASURING HEAD DEVIATION AND METHOD AND APPARATUS FOR RECORDING/REPRODUCING DATA

BACKGROUND OF THE INVENTION

1. Field of the Invention

This invention relates to a head deviation measurement method, a data recording/reproducing method, a head deviation measurement apparatus and a data recording/reproducing apparatus. For example, it relates to a magnetic disc apparatus on which a recording head for recording data on a magnetic disc and a playback head for reproducing data from the magnetic disc are provided separately from each other.

2. Description of the Related Art

In a magnetic disc apparatus for recording data on a disc-shaped recording medium, such as a magnetic disc, or reproducing data from a magnetic disc, a so-called magnetoreluctance type head (MR head) is used as a playback head for raising the playback sensitivity. In this type of the magnetic disc apparatus, that is a magnetic disc apparatus provided with an induction type (ind type) recording head and an MR type playback head, the playback head is designed so as to have a width narrower than that of the recording head, that is the width of the playback head is reduced as compared to the width of the track formed by the recording head scanning the magnetic disc, so that no operating hindrances will be caused even if the magnetic disc apparatus is produced with the center of the recording head deviated from the center of the playback head such that the center of the playback head is deviated from the center of the track formed by the recording head.

However, this method has a drawback that the width of the recording head needs to be designed with an allowance to a broader width, such that it is not possible to raise the recording density.

There is also known such a magnetic disc apparatus in which the recording head is designed to have a width approximately equal to the width of the playback head and the deviation between the center of the recording head and that of the playback head are optically measured in the head producing process using, for example, a microscope, this deviation being then sent as a correction amount (termed offset) to a positioning servo (so-called tracking servo) circuit so as to be summed to or subtracted from a positioning error signal (so-called tracking error signal) representing the position deviation in order to correct the tracking position of the recording head or the playback head and in order to eliminate the designing allowance referred to above for realizing a high recording density. However, the deviation between the center of the recording head and that of the playback head is time-consuming and costly, while the above method cannot cope with transmutations with lapse of time.

SUMMARY OF THE INVENTION

It is therefore an object of the present invention to provide a head deviation measurement method and apparatus whereby the deviation between the recording head and the playback head may be measured easily.

It is another object of the present invention to provide a data recording/reproducing method and apparatus whereby data recording/reproduction may be done correctly despite deviation between the recording head and the playback head.

In one aspect, the present invention provides a head deviation measurement method including recording test data by a recording head on a disc-shaped recording medium, reproducing the test data by a playback head from the disc-shaped recording medium at the same time as the playback head is wobbled along the radius of the disc-shaped recording medium, and detecting the deviation between the recording head and the playback head based on a difference between a first sum of amplitudes of a first group of sectors of playback signals corresponding to the reproduced test data and a second sum of amplitudes of a second group of sectors different from the first group of the playback signals.

In another aspect, the present invention provides a head deviation measurement method including recording test data by a playback head on the disc-shaped recording medium at the same time as the recording head is wobbled along the radius of the disc-shaped recording medium, reproducing the test data by a playback head from the disc-shaped recording medium, and detecting the deviation between the recording head and the playback head based on a difference between a first sum of amplitudes of a first group of sectors of playback signals corresponding to the reproduced test data and a second sum of amplitudes of a second group of sectors different from the first group of the playback signals.

In a further aspect, the present invention provides a head deviation measurement method including recording test data by a recording head on a disc-shaped recording medium, reproducing the test data by a playback head at the same time as the playback head is wobbled with respect to a position on a track of the disc-shaped recording medium offset a pre-set computing a difference between a first sum of amplitudes of a first group of sectors of playback signals corresponding to the reproduced test data and a second sum of amplitudes of a second group of sectors different from the first group of the playback signals, reproducing the test data and computing the difference at the same time as the playback head is wobbled relative to a position on the track offset by an offset value updated based on a directly previous difference value with respect to the center position of the track, until an absolute value of the difference becomes smaller than a pre-set value, and repeating the process of reproducing the test data and computing the difference for detecting the amount of deviation between the recording head and the playback head.

In a further aspect, the present invention provides a head deviation measurement method including recording test data by a playback head on the disc-shaped recording medium at the same time as the recording head is wobbled along the radius of the disc-shaped recording medium, reproducing the test data from the disc-shaped recording medium by a playback head at the same time as the playback head is positioned at a position on a track of the disc-shaped recording medium offset by a pre-set distance from the center position of the track, and computing a difference between a first sum of amplitudes of a first group of sectors of playback signals corresponding to the reproduced test data and a second sum of amplitudes of a second group of sectors different from the first group of the playback signals.

In a further aspect, the present invention provides a data recording/reproducing method including recording test data by a recording head on a disc-shaped recording medium prior to recording or reproducing actual data, reproducing test data by a playback head from the disc-shaped recording medium at the same time as the playback head is wobbled along the radius of the disc-shaped recording medium, detecting the deviation between the recording head and the playback head based on a difference between a first sum of amplitudes of a first group of sectors of playback signals corresponding to the reproduced test data and a second sum of amplitudes of a second group of sectors different from the first group of the playback signals, and correcting the position of the recording head or the playback head along the radius of the disc-shaped recording medium at the time of recording or reproducing the: actual data based on the detected amount of deviation.

In a further aspect, the present invention provides a data recording/reproducing method including recording test data by a recording head on a disc-shaped recording medium prior to recording or reproducing actual data at the same time as the recording head is wobbled along the radius of the disc-shaped recording medium, reproducing the test data from the disc-shaped recording medium by a playback head, detecting the deviation between the recording head and the playback head based on a difference between a first sum of amplitudes of a first group of sectors of playback signals corresponding to the reproduced test data and a second sum of amplitudes of a second group of sectors different from the first group of the playback signals, and correcting the position of the recording head or the playback head along the radius of the disc-shaped recording medium at the time of recording or reproducing the actual data based on a detected amount of the deviation.

In a further aspect, the present invention provides a head deviation measurement method including recording test data by a recording head on a disc-shaped recording medium prior to recording or reproducing actual data, reproducing the test data by a playback head at the same time as the playback head is wobbled with respect to a position on a track of the disc-shaped recording medium offset a pre-set distance from the center position of the track, computing a difference between a first sum of amplitudes of a first group of sectors of playback signals corresponding to the reproduced test data and a second sum of amplitudes of a second group of sectors different from the first group of the playback signals, repeatedly reproducing the test data and computing the difference at the same time as the playback head is wobbled relative to a position on the track offset with respect to the center position of the track by an offset distance updated based on a directly previous difference value, until an absolute value of the difference becomes smaller than a pre-set value, for detecting the amount of deviation between the recording head and the playback head, and correcting the position of the recording head or the playback head along the radius of the disc-shaped recording medium based on the detected amount of deviation at the time of recording or reproducing the actual data.

In a further aspect, the present invention provides a data recording/reproducing method including recording test data by a recording head on a disc-shaped recording medium prior to recording or reproducing actual data, at the same time as the recording head is wobbled along the radius of the disc-shaped recording medium, reproducing the test data from the disc-shaped recording medium by a playback head at the same time as the playback head is positioned at a position on a track of the disc-shaped recording medium offset by a pre-set distance from the center of the track, computing a difference between a first sum of amplitudes of a first group of sectors of playback signals corresponding to the reproduced test data and a second sum of amplitudes of a second group of sectors different from the first group of the playback signals, repeatedly reproducing the test data and computing the difference at the same time as the playback head is positioned relative to a position on the track offset with respect to the center of the track by an offset distance updated based on a directly previous difference value, until an absolute value of the difference becomes smaller than a pre-set value, for detecting the amount of deviation between the recording head and the playback head, and correcting the position of the recording head or the playback head at the time of recording or reproducing the actual data based on the detected amount of deviation.

In a further aspect, the present invention provides a head deviation measurement apparatus including a recording head for recording test data on a disc-shaped recording medium, a playback head wobbled along the radius of the disc-shaped recording medium for reproducing the test data from the disc-shaped recording medium, and head deviation detection means for detecting the deviation between the recording head and the playback head based on a difference between a first sum of amplitudes of a first group of sectors of playback signals corresponding to the reproduced test data and a second sum of amplitudes of a second group of sectors different from the first group of the playback signals.

Preferably, the head deviation detection means includes amplitude detection means for detecting the amplitude of playback signals corresponding to the test data reproduced by the playback head, difference computing means for computing a difference between a first sum of amplitudes of a first group of sectors of playback signals and a second sum of amplitudes of a second group of sectors different from the first group of the playback signals, and deviation computing means for computing an amount of deviation between the recording head and the playback head based on the difference from the difference computing means. The amplitudes is previously detected by the amplitude detection means.

In a further aspect, the present invention provides a head deviation measurement apparatus including a recording head wobbled along the radius of a disc-shaped recording medium for recording test data thereon, a playback head for reproducing test data from the disc-shaped recording medium, and head deviation detection means for detecting the deviation between the recording head and the playback head based on a difference between a first sum of amplitudes of a first group of sectors of playback signals corresponding to the reproduced test data and a second sum of amplitudes of a second group of sectors different from the first group of the playback signals.

Preferably, the head deviation detection means includes amplitude detection means for detecting the amplitude of playback signals corresponding to the test data reproduced by the playback head, difference computing means for computing a difference between a first sum of amplitudes of a first group of sectors of playback signals corresponding to the reproduced test data and a second sum of amplitudes of a second group of sectors different from the first group of the playback signals, and deviation computing means for computing an amount of deviation between the recording head and the playback head based on the difference from the difference computing means. The amplitudes is previously detected by the amplitude detection means.

In a further aspect, the present invention provides a head deviation measurement apparatus including a recording head wobbled along the radius of a disc-shaped recording medium for recording test data thereon, a playback head for reproducing the test data at the same time as it is wobbled with respect to a position on a track of the recording medium offset by a pre-set offset distance from the center of the track, and means for repeatedly reproducing the test data and computing the difference at the same time as the playback head is wobbled relative to a position on the track offset an offset distance updated based on a directly previous difference value with respect to the center of the track, until an absolute value of the difference becomes smaller than a pre-set value, for detecting the amount of deviation between the recording head and the playback head.

Preferably, the head deviation detection means includes amplitude detection means for detecting the amplitude of playback signals corresponding to the test data reproduced by the playback head, difference computing means for computing a difference between a first sum of amplitudes of a first group of sectors and a second sum of amplitudes of a second group of sectors different from the first group of the playback signals, and control means operating for repeatedly reproducing the test data and computing the difference at the same time as the playback head is wobbled relative to a position on the track offset an offset distance updated based on a directly previous difference value with respect to the center position of the track, until an absolute value of the difference becomes smaller than a pre-set value, for detecting the amount of deviation between the recording head and the playback head. The amplitude is previously detected by the amplitude detection means.

In a further aspect, the present invention provides a head deviation measurement apparatus including a recording head for recording test data on a disc-shaped recording medium, the recording head being wobbled along the radius of the disc-shaped recording medium, a playback head for reproducing the test data at the same time as the playback head is wobbled with respect to a position on a track of the disc-shaped recording medium offset by a pre-set distance from the center position of the track, and head deviation detection means operating for computing a difference between a first sum of amplitudes of a first group of sectors of playback signals corresponding to the reproduced test data and a second sum of amplitudes of a second group of sectors different from the first group of the playback signals. The head deviation detection means also operates for repeatedly reproducing the test data and computing the difference at the same time as the playback head is set at a position on the track offset with respect to the center position of the track by an offset distance updated based on a directly previous difference value, until an absolute value of the difference becomes smaller than a pre-set value, for detecting the amount of deviation between the recording head and the playback head.

Preferably, the head deviation detection means includes amplitude detection means for detecting the amplitude of playback signals corresponding to the test data reproduced by the playback head, difference computing means for computing a difference between a first sum of amplitudes of a first group of sectors and a second sum of amplitudes of a second group of sectors different from the first group of the playback signals, and control means operating for repeatedly reproducing the test data and computing the difference at the same time as the playback head is set at a position on the track offset with respect to the center of the track by an offset distance updated based on a directly previous difference value, until an absolute value of the difference becomes smaller than a pre-set value, for detecting the amount of deviation between the recording head and the playback head. The amplitudes is previously detected by the amplitude detection means.

In a further aspect, the present invention provides a data recording/reproducing apparatus including a recording head for recording data on a disc-shaped recording medium, a playback head for reproducing data from the disc-shaped recording medium, wobbling means for wobbling the playback head along the radius of the disc-shaped recording medium, and correction means operating for recording test data on the disc-shaped recording medium or reproducing the test data from the disc-shaped recording medium as the playback head is wobbled by the wobbling means. The recording/reproduction of the test data is done prior to recording/reproduction of actual data. The correction means also operates for detecting an amount of deviation between the recording head and the playback head based on a difference between a first sum of amplitudes of a first group of sectors of playback signals corresponding to the reproduced test data and a second sum of amplitudes of a second group of sectors different from the first group of the playback signals. The correction means corrects the position of the recording head or the playback head along the radius of the disc-shaped recording medium, at the time of recording/reproducing the actual data, based on a detected amount of the deviation.

Preferably, the correction means includes amplitude detection means for detecting the amplitude of playback signals corresponding to the test data reproduced by the playback head, difference computing means for computing a difference between a first sum of amplitudes of a first group of sectors and a second sum of amplitudes of a second group of sectors different from the first group of the playback signals, and control means operating for computing an amount of deviation between the recording head and the playback head based on the difference value from the difference computing means for correcting the position of the recording head or the playback head based on the amount of deviation. The amplitudes is previously detected by the amplitude detection means.

Preferably, the data recording/reproducing apparatus further includes offset means for applying pre-set offset with respect to the center of a track on the disc-shaped recording medium for varying the position of the playback head. The correction means causes the playback head to be wobbled about a position on a track offset from the center position of the track by an offset distance updated based on a directly previous difference. The correction means causes the reproduction of the test data and calculation of the difference to be repeated for detecting the deviation between the recording head and the playback head for correcting the position of the recording head or the playback head at the time of recording/reproducing actual data based on a detected amount of the deviation.

Preferably, the correction means includes amplitude detection means for detecting the amplitude of playback signals corresponding to the test data reproduced by the playback head, difference computing means for computing a difference between a first sum of amplitudes of a first group of sectors and a second sum of amplitudes of a second group of sectors different from the first group of the playback signals. The amplitudes is previously detected by the amplitude detection means. The control means causes the playback head to be wobbled about a position on a track offset from the center position of the track by an offset value updated based on a directly previous difference. The correction means also causes the reproduction of the test data and calculation of the difference to be repeated for detecting the deviation between the recording head and the playback head for correcting the position of the recording head or the playback head based on a detected amount of the deviation.

In a further aspect, the present invention provides a data recording/reproducing apparatus including a recording head for recording data on a disc-shaped recording medium, a playback head for reproducing data from the disc-shaped recording medium, wobbling means for wobbling the playback head along the radius of the disc-shaped recording medium and correction means operating for recording test data on the disc-shaped recording medium by the recording head wobbled by the wobbling means or reproducing the test data from the disc-shaped recording medium by the playback head. The recording/reproduction of the test data is previously done prior to recording/reproduction of actual data. The correction means also operates for detecting an amount of deviation between the recording head and the playback head based on a difference between a first sum of amplitudes of a first group of sectors of playback signals corresponding to the reproduced test data and a second sum of amplitudes of a second group of sectors different from the first group of the playback signals. The correction means corrects the position of the recording head or the playback head along the radius of the disc-shaped recording medium, at the time of recording/reproducing the actual data, based on a detected amount of the deviation.

Preferably, the correction means includes amplitude detection means for detecting the amplitude of playback signals corresponding to the test data reproduced by the playback head, difference computing means for computing a difference between a first sum of amplitudes of a first group of sectors and a second sum of amplitudes of a second group of sectors different from the first group of the playback signals, and control means operating for computing an amount of deviation between the recording head and the playback head based on the difference value from the difference computing means for correcting the position of the recording head or the playback head based on a amount of the deviation. The amplitudes is previously detected by the amplitude detection means Preferably, the data recording/reproducing apparatus further includes offset means for applying pre-set offset with respect to the center of a track on the disc-shaped recording medium for varying the position of the playback head. The playback head is positioned with respect to a position on a track offset from the center position of the track by an offset distance updated based on a directly previous difference. The reproduction of the test data and calculation of the difference are repeated for detecting the deviation between the recording head and the playback head for correcting the position of the recording head or the playback head based on a detected amount of the deviation.

Preferably, the correction means of the data recording/reproducing apparatus includes amplitude detection means for detesting the amplitude of playback signals corresponding to the test data reproduced by the playback head, difference computing means for computing a difference between a first sum of amplitudes of a first group of sectors and a second sum of amplitudes of a second group of sectors different from the first group of the playback signals, and control means causing the playback head to be positioned with respect to a position on a track offset from the center position of the track by an offset distance updated based on a directly previous difference. The amplitudes is previously detected by the amplitude detection means. The correction means causes the reproduction of the test data and calculation of the difference to be repeated for detecting the deviation between the recording head and the playback head for correcting the position of the recording head or the playback head based on a detected amount of the deviation.

According to the present invention, the recording head or the playback head is wobbled prior to recording/reproducing actual data, and test data is recorded by the recording head on a disc-shaped recording medium, while the test data is reproduced from the recording medium by the playback head. The deviation between the recording head and the playback head is detected based on the difference between a first sum of amplitudes of playback signals in a pre-set group of sectors of reproduced signals corresponding to the reproduced test data and a second sum of playback signals in another pre-set group of sectors of the reproduced signals. Thus the deviation between the recording head and the playback head can be measured easily and accurately.

The position of the recording head or the playback head is corrected, at the time of recording or reproduction of actual data, based on the detected deviation.

By detecting the deviation between the recording head and the playback head prior to recording or reproduction of actual data, chronological changes can be coped with. Stated differently, there is no necessity of measuring deviation at the time of production, while production costs can be diminished.

By computing the deviation between the center of the recording head and the center of the playback head prior to recording/reproducing the actual data, and utilizing the deviation thus found for correcting the head position at the time of actual data recording/reproduction, the recording head and the playback head sweep the same position on the track despite deviation between the centers of the recording head and the playback head, thus enabling data to be reproduced correctly.

Since the measurement algorithm used in the present invention can be executed by digital processing by a processor, it can be realized by a simple modification of a conventional system.

DESCRIPTION OF THE PREFERRED EMBODIMENTS

Figure 1:
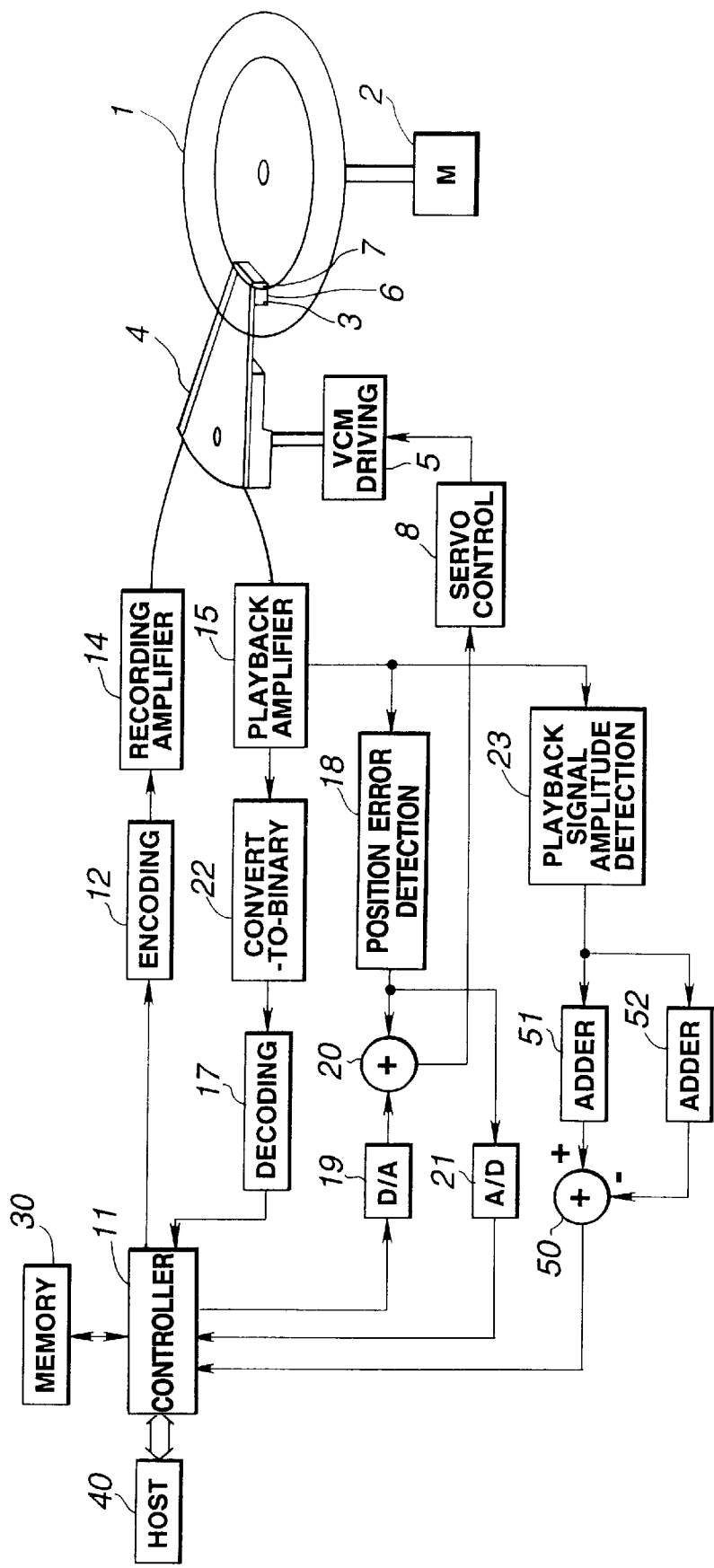
FIG. 1 is a block diagram showing a first embodiment of a head deviation measurement method, a data recording/reproducing method, a head deviation measurement apparatus and a data recording/reproducing apparatus according to the present invention.

Referring to the drawings, several preferred embodiments of the head deviation measurement method, data recording/reproducing method, head deviation measurement apparatus and the data recording/reproducing apparatus will be explained in detail.

A first embodiment is first explained. This first embodiment is a magnetic head device in which a magnetic disc, for example, is used as a disc-shaped recording medium, an induction head (ind head) is used as a recording head and a magneto-reluctance (MR) head is used as a playback head. FIG. 1 shows essential portions of the magnetic head device in a block diagram.

Referring to FIG. 1, the magnetic head device includes a controller 11 for generating test data for outputting the test data or data from a host computer 40, and an encoding circuit 12 for encoding the data from the controller 11 or the test data. The magnetic head device also includes a recording amplifier 14 for generating recording signals based on data encoded by the encoding circuit 12 and a recording head 6 for recording data on a magnetic disc 1 based on the recording signals from the recording amplifier 14. The magnetic head device also includes a playback head 7 for reproducing data from the magnetic disc 1 and a playback amplifier 15 for reproducing playback signals from the playback head 7. The magnetic head device further includes a convert-to-binary circuit 22 for converting the playback signals from the playback amplifier 15 into binary-valued playback data and for outputting the playback data and a decoding circuit 17 for decoding the playback data from the convert-to-binary circuit 22 for reproducing the original data.

During actual data recording or reproduction, the controller 11 feeds data supplied from the host computer 40 via a so-called small computer system interface (SCSI) to the encoding circuit 12.

The encoding circuit 12 encodes data in a pre-set manner, that is in accordance with a coding rule appropriate for recording data on the magnetic disc 1, and sends the resulting recoding data to the recording amplifier 14.

The recording amplifier 14 generates recording signals based on the recording data and drives the recording head 6 by these recording signals.

Referring to FIG. 1, the magnetic disc device includes a motor 2 for rotationally driving the magnetic disc 1 and a head 3 made up of the recording head 6 and the playback head 7 formed as one with each other. The magnetic disc device also includes an arm 4 for moving the head 3 radially of the magnetic disc 1 and a voice coil motor driving circuit (VCM driving circuit) 5 for rotationally driving the arm 4.

The head 3 is moved under servo control by a servo control circuit 8, as later explained, for positioning the head 3, that is the recording head 6 and the playback head 7, radially of the magnetic disc 1. With the recording head 6 in position, the recording current is caused to flow in the recording head 6 so that a track having recorded thereon recording signals conforming to the data is formed on the recording surface of the magnetic disc 1. The recording signals conforming to the data are referred to hereinafter as data.

The data is reproduced from the magnetic disc 1 as now explained. The playback head 7 is positioned under servo control by the servo control circuit 8. The playback head 7 scans a target track of the magnetic disc 1 and sends the playback signals to the playback amplifier 15.

The playback amplifier 15 is made up of an amplifier and an equalizer for amplifying the playback signals from the playback head 7 for equalizing the waveform. The waveform-equalized playback signals are supplied to the convert-to-binary circuit 22.

The convert-to-binary circuit 22 converts the playback signals from the playback amplifier 15 to generate playback data which is sent to the decoding circuit 17.

The decoding circuit 17 is a counterpart of the encoding circuit 12 of the recording system and decodes the playback data supplied from the convert-to-binary circuit 22 to reproduce original data which is supplied to the controller 11. The controller 11 outputs the data supplied from the decoding circuit 17 via SCSI to the host computer 40.

The present first embodiment of the magnetic disc device includes a position error detection circuit 18 for detecting deviation from the track center of the playback head 7 based on the playback signals from the playback amplifier 15 and an A/D converter 19 for converting modulation data from the controller 11 for wobbling the head 3 into modulation signals. The magnetic disc device also includes an adder 20 for summing the position error signal from the position error detection circuit 18 to the modulation signals from the A/D converter 19 to send the resulting sum signal to the servo control circuit 8 and an A/D converter 21 for converting a position error signal from the position error detection circuit 18 into data and for supplying the data to the controller 11. The magnetic disc device also includes a playback signal amplitude detection circuit 23 for detecting the amplitude of the playback signal from the playback amplifier 15 and adders 51, 52 for cumulatively summing amplitude values of the playback signal in a pre-set sector group and in other pre-set sector groups of the magnetic disc 1 sent from the playback signal amplitude detection circuit 23, respectively, and a subtractor 50 for finding the difference between the sum value of the adder 51 and the sum value of the adder 52 for supplying the resulting difference to the controller 11.

Before actually recording data such as on power up, the position error detection circuit 18 detects the level difference of the playback signal from the playback amplifier 15, corresponding to two offset recording head positioning marks formed towards the inner rim and the outer rim of the magnetic disc 1 relative to the track center and sends this level difference as a position error signal specifying the deviation of the center of the playback head 7 relative to the track center to the adder 20. At this time, the controller 11 sets the modulation data all to zero and sends the all-zero data to the D/A converter 19, which then converts the modulation data into analog signals sends the resulting analog data to the adder 20. Thus the adder 20 directly sends the phase error signal supplied from the position error detection circuit 18 to the servo control circuit 8. The VCM driving circuit 5, receiving the servo control signal from the servo control circuit 8, is responsive to the position error signal from the adder 20 for driving the VCM for rotating the arm 4. Servo control is applied so that the center of the playback head 7 loaded on the head 3 will be coincident with the track center.

The playback signal amplitude detection circuit 23 detects the amplitude of the playback signals from the playback amplifier 15 in a manner which will be explained subsequently.

Data recording on the magnetic disc 1, data reproduction from the magnetic disc 1 and detection of the amplitude of the playback signals are carried out in this manner. In the present first embodiment of the magnetic disc device, test data are recorded and reproduced as described above before recording or reproducing actual data and, using the amplitude values of the playback signals at this time, the deviation of the centers of the recording head 6 and the playback head 7 is computed. In recording or reproducing actual data, this deviation is taken into account in carrying out tracking servo control of the recording head 6 and the playback head 7.

The method of recording/reproducing test data and the method of computing the deviation between the center of the recording head 6 and the center of the playback head 7 from each other from the amplitude values of the playback signals will now be explained by referring to FIG. 2.

First, the controller 11 brings the center of the playback head 7 into coincidence with a center 31 of the track using only the position error signal of the position error detection circuit 18. In this state, the controller 11 sends pre-set test data, for example, N sectors of test data each made up of the same number of bytes, such as 512 bytes, to the encoding circuit 12. The result is that the test data is recorded by the recording head 6 on the sectors #1 through to #N of the recording track 33 of the magnetic disc 1.

Figure 2:
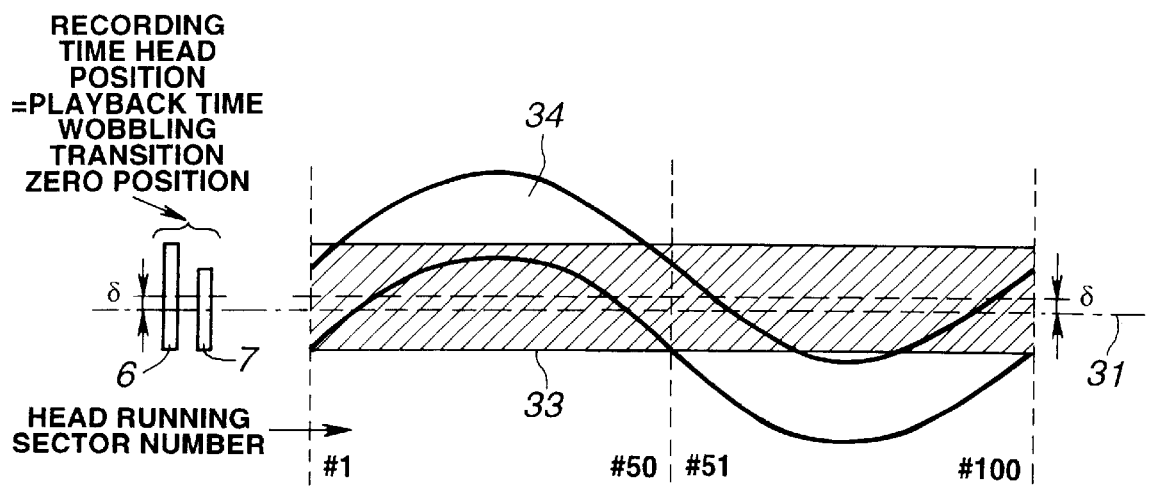
FIG. 2 shows a typical example of a trajectory of a recording head and a playback head in the first embodiment shown in FIG. 1.

It is noted that the center of the recording head 6 is not necessarily coincident with the center of the playback head 7, as shown in FIG. 2. If the amount of deviation between the center of the recording head 6 and the center of the playback head 7 is δ, the test data is recorded at a position deviated by δ from the track center 31 for forming the recording track 33.

The playback head 7 is then controlled so as to be positioned for wobbling with respect to the track center 31 for reproducing the test data.

This wobbling of the playback head 7 relative to the track center 31 is carried out by displacing the playback head 7 by f(θ) relative to a true circular track.

Figure 3:
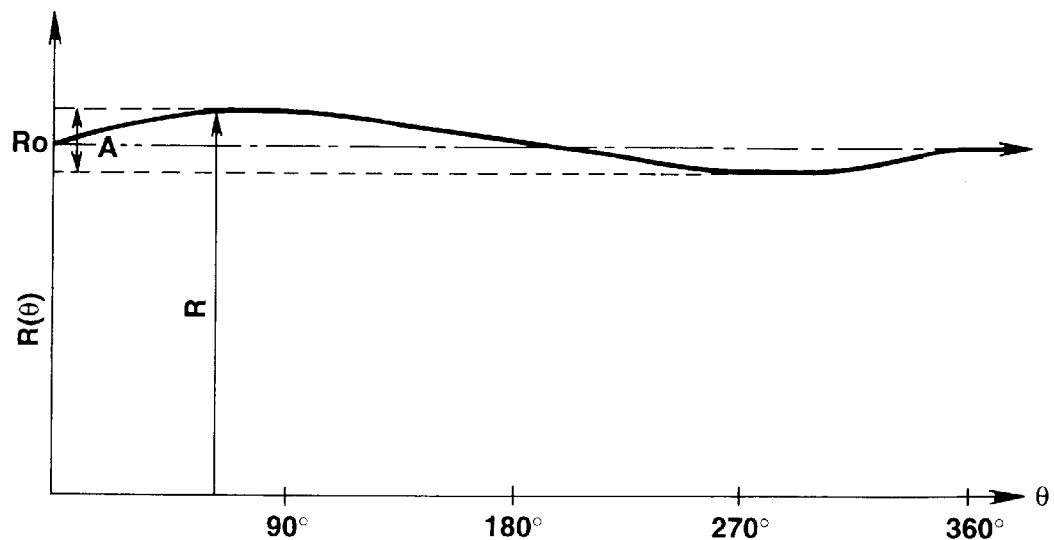
FIG. 3 shows typical examples of modulation data.

Specifically, the controller 11 sends sinusoidal modulation data to the D/A converter 19. The sinusoidal modulation data has its period corresponding to a complete revolution of the magnetic disc 1 and has an amplitude A, as indicated by the equation (1):

$$f(\theta) = A \sin(\theta) \quad (1)$$

that is, as shown in FIG. 3.

The D/A converter 19 converts the sinusoidal modulation data into modulation signals which are supplied to the adder 20. The adder 20 sums the position error signal supplied from the position error detection circuit 18 to the modulation signal from the D/A converter 19 and sends the resulting sum signal via servo control circuit 8 to the VCM driving circuit 5. The result is that the playback head 7 runs sinusoidally in the radial direction with respect to the track center 31 for sweeping an area 34 of the magnetic disc 1. If the value of the amplitude A is one-half the maximum amplitude (so-called peak-to-peak or p—p value) of the position error signal, the playback head 7 causes the magnetic disc 1 to run in a meandering path with deviation of 0.5 track from the track center 31.

Figure 4A:
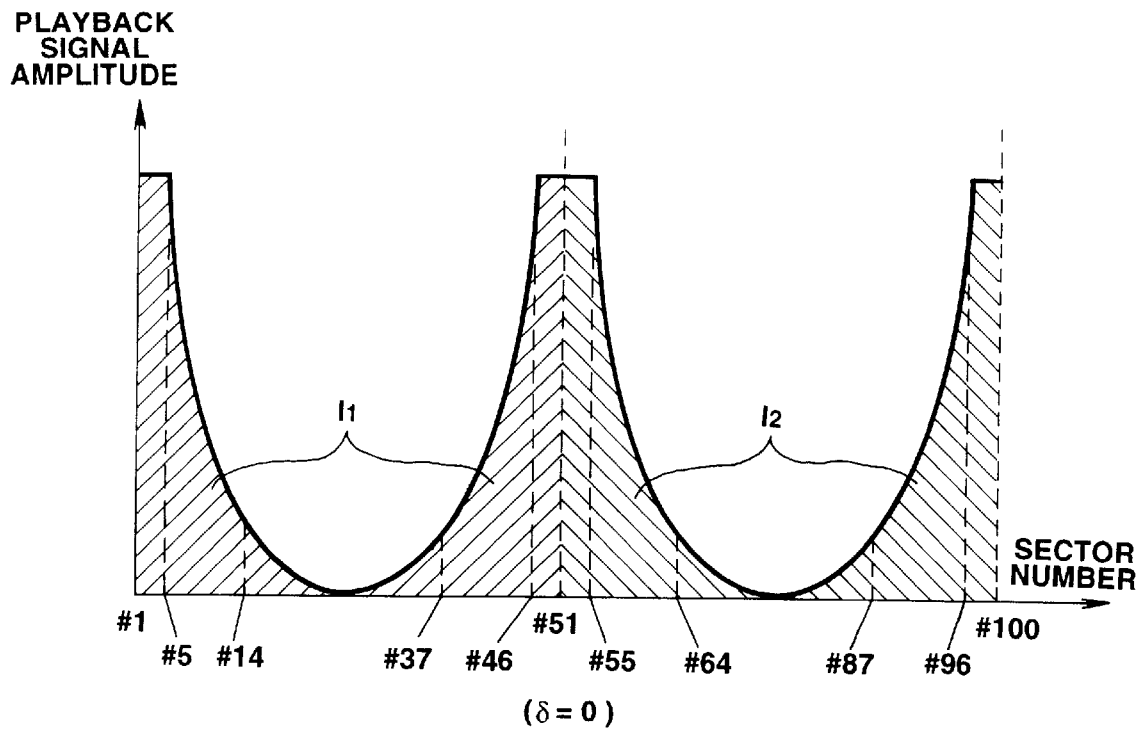
FIGS. 4A and 4B are graphs showing amplitude values of playback signals of test data used in the first embodiment shown in FIG. 1.
Figure 4B:
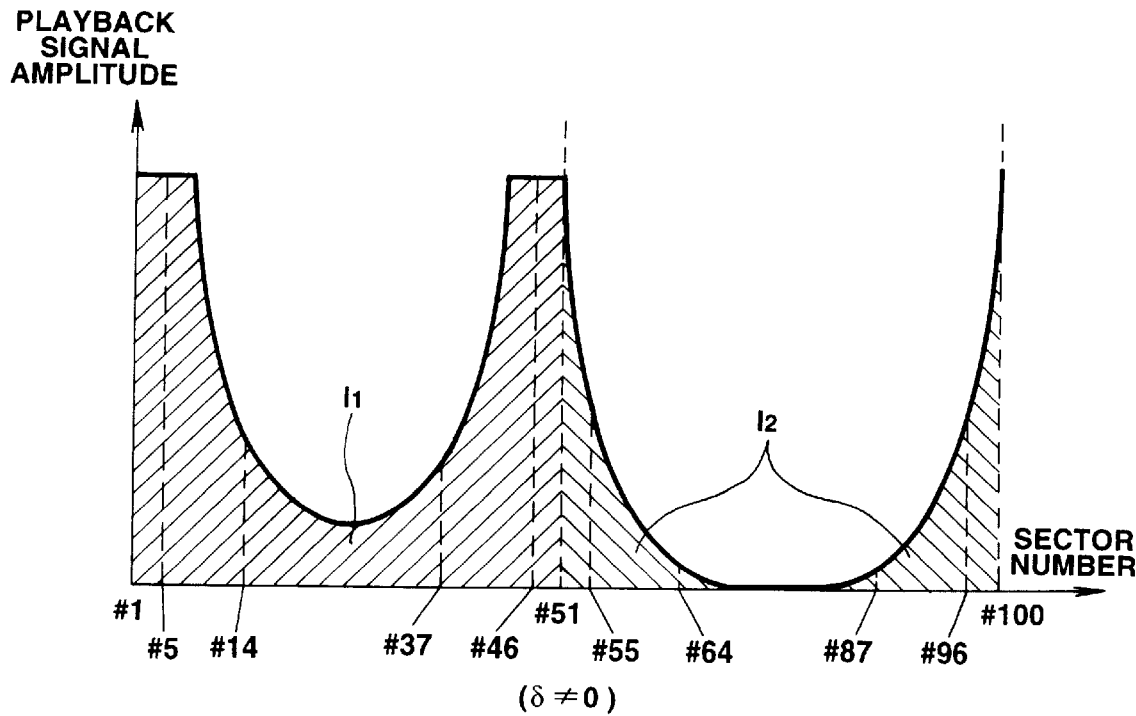

If the number of sectors N is 100, and the playback head 7 is run with sinusoidal deviation towards the (+) side and towards the (−) side for the sectors #1 to #50 and for the sectors #51 to #100, the amplitude values of the playback signals of the sector-based test data for the sectors #1 to #50 become symmetrical relative to those of the sector-based test data for the sectors #51 to #100 for the amount of deviation δ between the center of the recording head 6 and the center of the playback head 7 equal to 0, as shown in FIG. 4A. If the amount of deviation δ is not zero, there is caused a difference in amplitude values between corresponding ones of the sectors #1 to #50 and the sectors #51 to #100, as shown in FIG. 4B.

With the present first embodiment of the magnetic disc device, the playback signal amplitude detection circuit 23 detects the amplitude values of the playback signals of the sectors #1 to #50 and the sectors #51 to #100, in order to find the amount of deviation δ between the recording head 6 and the playback head 7 responsive to the difference between these amplitude values.

Specifically, the amplitude values of the playback signals of the sectors #1 to #50 and the amplitude values of the playback signals of the sectors #51 to #100, as found by the playback signal amplitude detection circuit 23, are cumulatively summed by the adders 51, 52, respectively, over one complete revolution or over several revolution of the magnetic disc 1 to find sum values $I_1$ and $I_2$, respectively, in order to input the difference $\Delta I$ to the controller 11.

Figure 5:
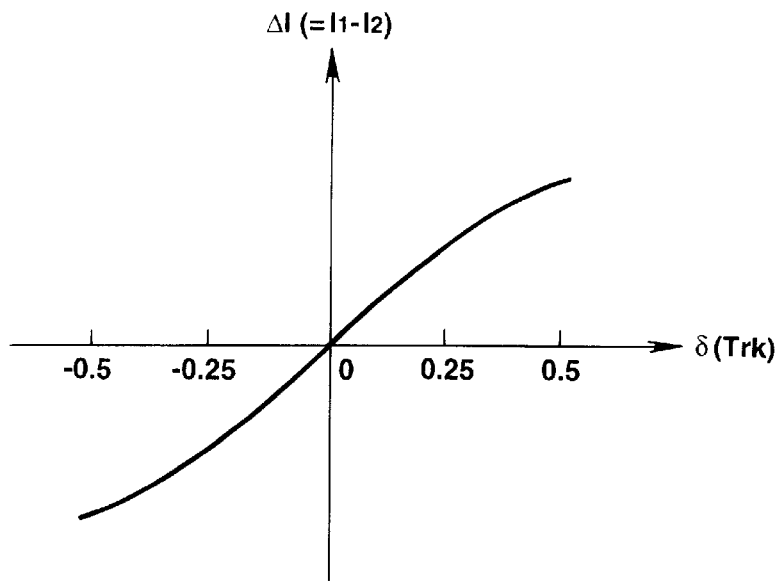
FIG. 5 is a graph showing the relation between the amount of deviation δ between the center of the recording head and that of the playback head in the first embodiment and the difference of amplitude sum values ΔI in the first embodiment shown in FIG. 1.

Since the amount of deviation δ and the difference of the amplitude sum values $\Delta I$ are monotonously related with each other as shown in FIG. 5, it is possible for the controller 11 to refer to a table showing these related data or to execute calculations of linear approximation in order to find the amount of deviation δ between the center of the recording head 6 and the center of the playback head 7 from the input difference of the amplitude sum values $\Delta I$.

In the magnetic disc device, shown in FIG. 1, the amplitudes of the playback signals of the sectors #1 to #50 and the sectors #51 to #100 from the playback signal amplitude detection circuit 23 are cumulatively summed by the adders 51 and 52, respectively, and the difference between these sum values $I_1$ and $I_2$ is computed by the subtractor 50 in order to find the difference of the amplitude sum values $\Delta I$. It is however possible to provide an adder/subtractor 53 downstream of the playback signal amplitude detection circuit 23 for summing the playback signal amplitude values for the sectors #1 to #50 and for subtracting the playback signal amplitude values for the sectors #51 to #100 to produce an ultimate result which is sent to the controller 11.

In the above-described magnetic disc device, the amplitude values of the playback signals of all the sectors are used. However, the amplitude values of the playback signals of part of the sectors may also be used. For example, the difference $\Delta I\!\!E$ between the sum value $I\!\!E_1$ of playback signal amplitude values in the sectors #5 to 14 and in the sectors #37 to 46, totaling 20 sectors, and the sum value $I\!\!E_2$ of playback signal amplitude values in the sectors #55 to 64 and in the sectors #87 to 96, totaling 20 sectors, may be inputted to the controller 11. In this case, similar effects to those obtained when using the playback signal amplitude values in the totality of the sectors are obtained, although the conversion gain of the deviation δ and the difference $\Delta I\!\!E$ of the amplitude sum values are changed.

The results thus detected exhibit precision higher than that obtained with optical measurement discussed in the prior art. Also, with the present magnetic disc device, the amount of deviation δ between the center of the recording head 6 and that of the playback head 7 can be periodically measured on power up or in the absence of, for example, recording/reproduction, for coping with changes in the amount of deviation δ with lapse of time. Stated differently, there is no necessity of measuring the amount of deviation δ at the time of manufacture, while the amount of deviation δ can be measured easily to reduce production cost.

If the computation of the amount of deviation δ between the center of the recording head 6 and that of the playback head 7 comes to a close in this manner, the controller 11 causes this value to be stored in a memory 30. During recording/reproduction of actual data, the controller 11 corrects the position of the recording head 6 and that of the playback head 7 based on the amount of deviation δ stored in the memory 30.

Specifically, the controller 11 reads out data corresponding to the amount of deviation δ from the memory 30 and routes the data as an amount of correction for correcting the deviation of the recording head 6 relative to the playback head 7 (offset) to the D/A converter 19. The adder 20 sums the offset of the fixed value to the position error signal supplied from the position error signal detection circuit 18 to route the resulting sum to the servo control circuit 8.

If the offset is given to the recording head 6, for example, the controller 11 routes data corresponding to the amount of deviation δ as offset to the D/A converter 19 at the time of data recording. The adder 20 sums the offset from the D/A converter 19 to the position error signal supplied from the position error signal detection circuit 18. The result is that the recording head 6 is servo-controlled so that its center coincides with the track center 31 and performs data recording in this state.

For reproducing the data, recorded in this manner, the controller 11 routes data with the offset value equal to zero to the D/A converter 19. This controls the playback head to be servo-controlled so that its center is coincident with the track center 31 by way of performing data reproduction. Thus, even if the center of the recording head 6 and that of the playback head 7 are deviated from each other, the recording head 6 and the playback head 7 sweep the same position on the recording surface for correctly reproducing the data. If the amount of deviation δ undergoes fluctuations from one magnetic disc device to another, data can be correctly reproduced by measuring the amount of deviation δ on power up as described above for correctly reproducing the data.

On the other hand, if the offset is given the playback head 7, the controller 11 routes data corresponding to the zero offset value to the D/A converter 19 at the time of data recording. The result is that the recording head records data at a position offset by δ from the track center 31 for forming the recording track 33.

During data reproduction, the controller 11 sends data corresponding to the amount of offset δ to the D/A converter 19 as an offset used for correcting the deviation of the playback head 7 for the recording head 6. The adder 20 sums the position error signal supplied from the position error detection circuit 19 to the offset. The result is that the playback head 7 is servo-controlled so that its center is at a position offset by δ from the track center 31, that is coincides with the center of the recording track 33, and performs data reproduction under this condition. Thus, even if the center of the recording head 6 is deviated from that of the playback head 7, the playback head 7 sweeps the recording track 33 formed by the recording head 6 for correctly reproducing the data.

Meanwhile, the playback head 7 is wobbled using the sinusoidal modulation data shown in the equation (1) above. However, a modification is also possible, as will now be explained.

As the modulation data for wobbling the playback head, modulation data of a triangular wave, having a complete revolution of the magnetic disc as one period and an inclination equal to ¤A, as shown in the following equation (2):

$$f(\theta) = A\theta \quad (0 \le \theta < \pi/2) \quad (2)$$
$$= -A\theta + B \quad (\pi/2 \le \theta < 3\pi/2)$$
$$= A\theta \quad (3\pi/2 \le \theta < 2\pi)$$

If the amplitude A π of the triangular wave is, for example, two tracks, the playback head 7 runs with a meandering of ¤1.0 track relative to the track center 31.

As the modulation data for wobbling the playback head, modulation data of a triangular wave, having a complete revolution of the magnetic disc as one period and an inclination equal to ¤A, as shown in the following equation (3):

$$f(\theta) = A\theta \quad (0 \le \theta < \pi < 2) \quad (3)$$
$$= A\theta - B \quad (\pi/2 \le \theta < 3\pi/2)$$
$$= A\theta - 2B \quad (3\pi/2 \le \theta < 2\pi)$$

In the present first embodiment of the magnetic disc device, the playback head 7 is wobbled using the modulation data from the controller 11. It is however possible to provide a positioning mark for the playback head on the magnetic disc 1 like the above-mentioned positioning mark for recording, to find the position error signal from the playback signal reproduced from the positioning mark for the playback head, and to use this position error signal in place of the modulation signal for wobbling the playback head 7. In this case, the playback head 7 can be wobbled with higher precision than is possible with the above-described magnetic disc device.

A second embodiment of the present invention is now explained. This second embodiment is directed to a magnetic disc device in which the recording head 6 is wobbled during recording of the test data while the playback head 7 is not wobbled during reproduction of the test data, in contradistinction from the above-described first embodiment of the magnetic disc device in which the playback head 7 is wobbled during reproduction of the test data in computing the deviation of the center of the recording head 6 from the center of the playback head 7.

Since the second embodiment of the magnetic disc device is configured similarly to the first embodiment of the magnetic disc device, shown in FIG. 1, reference is had to FIG. 1 without having reference to new figures showing the configuration of the magnetic disc device.

The present second embodiment of the magnetic disc device differs from the above-described first embodiment in wobbling the recording head 6 in recording the test data in computing the deviation between the center of the recording head 6 and the center of the playback head 7, and in reproducing the test data without wobbling the playback head 7. This difference in the operation is brought about by the controller 11.

Figure 7:
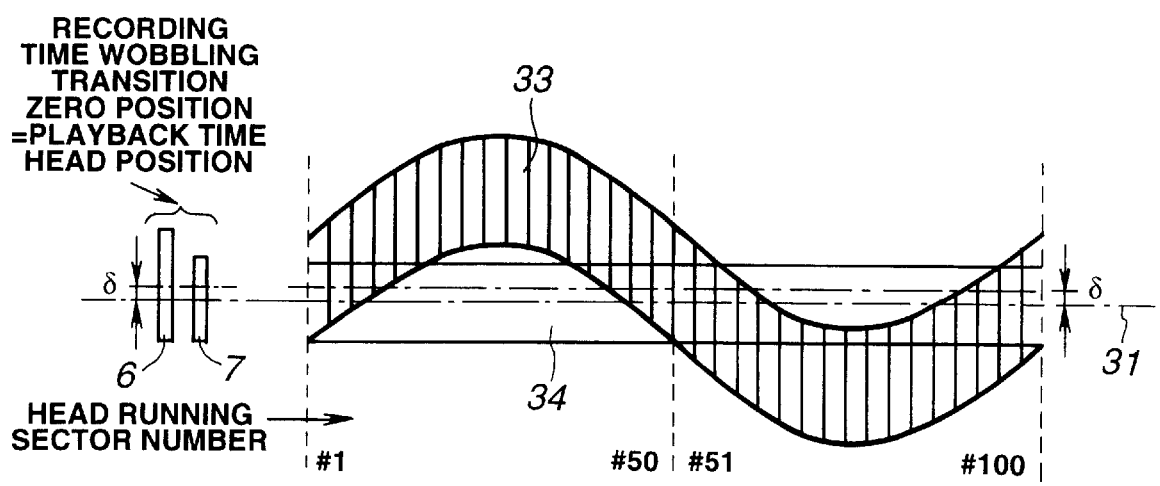
FIG. 7 shows a typical example of a trajectory of a recording head and a playback head in the second embodiment shown in FIG. 6.

The method for recording/reproducing the test data and the method for computing the deviation of the center of the recording head 6 from that of the playback head 7 from the amplitude values of the playback signals, in the present second embodiment of the magnetic disc device, is now explained by referring to FIG. 7.

With the playback head 7 positioned so that its center is coincident with the track center 31, the controller 11 feeds N sectors of pre-set test data, each made up of, for example, the same 512 bytes, to the encoding circuit 12. The result is that the test data are recorded by the recording head 6 on each sector from #1 to #N of the recording track 33 of the magnetic disc 1, as shown in FIG. 7. that is, the test data are recorded by being wobbled about a position deviated by $\delta$ between the center of the recording head 6 and the center of the playback head 7 for forming the recording track 33.

The recording head 6 is wobbled by supplying the sinusoidal modulation data to the D/A converter 19 as explained in the above-described first embodiment. The D/A converter 19 converts the sinusoidal modulation data into modulation signals which are routed to the adder 20.

The adder 20 sums the modulation signal from the D/A modulator 19 to the position error signal supplied from the position error detection circuit 18 and routes the resulting sum signal via servo control circuit 8 to the VCM driving circuit 5. The result is that the recording head 6 is run with a radial sinusoidal transition about a position deviated by $\delta$ from the track center 31 as center for forming the meandering recording track 33 on the magnetic disc 1.

With the playback head 7 positioned so that its center is coincident with the track center 31 by the position error detection circuit 18 and the servo control circuit 8, the test data on the meandering recording track 33 is reproduced under control by the controller 11.

Figure 8A:
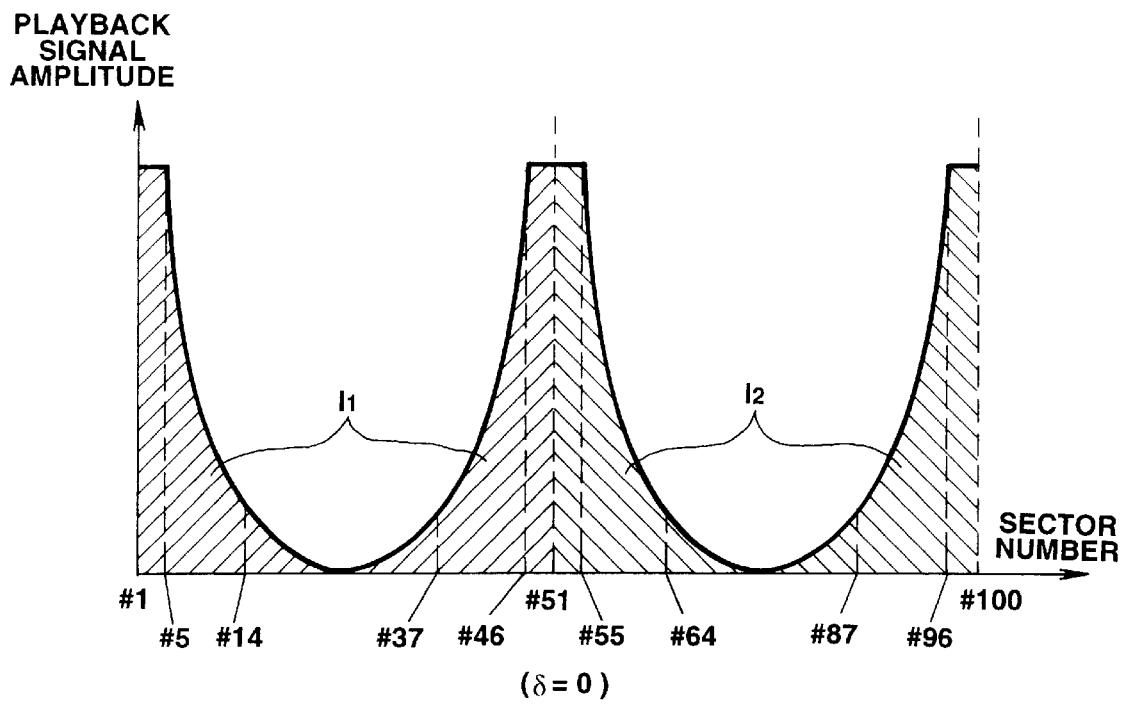
FIGS. 8A and 8B are graphs showing amplitude values of playback signals of test data used in the second embodiment shown in FIG. 6.

If, with the number of sectors N equal to 100, the controller 11 causes sinusoidal transition of the recording head 7 towards the (+) and (−) sides for the sectors #1 to #50 and for the sectors #51 to #100, respectively, as shown in FIG. 7, the amplitude values of the playback signals of the sector-based test data at the time of reproduction become symmetrical for the sectors #1 to #50 and for the sectors #51 to #100 for the amount of deviation $\delta$ of the center of the recording head 6 from that of the playback head 7, as in the first embodiment described above. However, if the amount of deviation $\delta$ is not zero, there is produced a difference in the amplitude values between corresponding sectors of the sectors #1 to #50 and the sectors #51 to #100, as shown in FIG. 8A.

With the present second embodiment of the magnetic disc device, the playback signal amplitude detection circuit 23 similarly detects the amplitude values of the playback signals of the sectors #1 to #50 and the sectors #51 to #100 in order to find the amount of deviation $\delta$ between the recording head 6 and the playback head 7 responsive to the difference in the amplitude values.

Specifically, the amplitude values of the playback signals for the sectors #1 to #50 and the sectors #51 to #100, as found by the playback signal amplitude detection circuit 23, are cumulatively summed by the adders 51 and 52, respectively, for one complete revolution or several revolutions of the magnetic disc 1, and a difference $\Delta I$ between the sums $I_1$ and $I_2$ is inputted to the controller 11.

Figure 9:
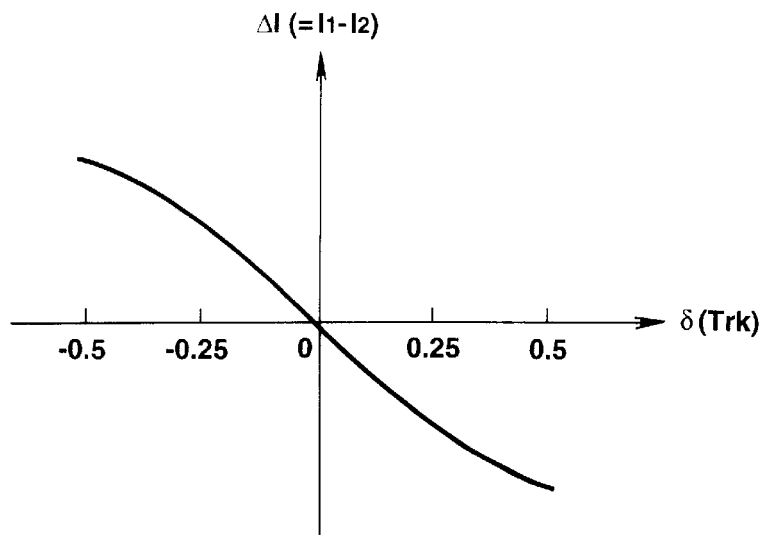
FIG. 9 is a graph showing the relation between the amount of deviation δ between the center of the recording head and that of the playback head in the first embodiment and the difference of amplitude sum values ΔI in the second embodiment shown in FIG. 6.

The amount of deviation $\delta$ and the difference of the amplitude sum values $\Delta I$ are monotonously related with each other as shown in FIG. 9, while having a tilt reversed from that of the first embodiment described with reference to FIG. 5. Thus it is possible for the controller 11 to refer to a table showing these related data or to execute calculations of linear approximation in order to find the amount of deviation $\delta$ between the center of the recording head 6 and the center of the playback head 7 from the difference of the input amplitude sum values $\Delta I$.

Figure 6:
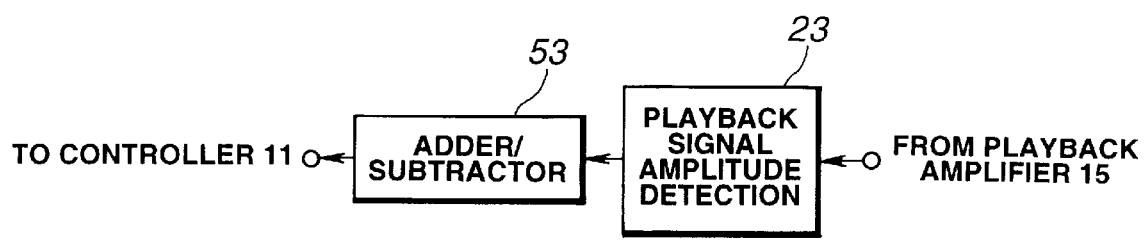
FIG. 6 is a block diagram showing the constitution of essential portions of a modification of the first embodiment shown in FIG. 1.

Meanwhile, with the present magnetic disc device of the present second embodiment, it is similarly possible to provide an adder/subtractor 53 downstream of the playback signal amplitude detection circuit 23, as shown in FIG. 6, for summing the playback signal amplitude values for the sectors #1 to #50 and for subtracting the playback signal amplitude values for the sectors #51 to #100 to produce an ultimate result which is sent to the controller 11.

In the above-described magnetic disc device, the amplitude values of the playback signals of part of the sectors may be used so that, for example, the difference $\Delta I \!\!\!E$ between the sum value $I \!\!\!E_1$ of playback signal amplitude values in the sectors #5 to 14 and in the sectors #37 to 46, totaling 20 sectors, and the sum value $I \!\!\!E_2$ of playback signal amplitude values in the sectors #55 to 64 and in the sectors #87 to 96, totaling 20 sectors, will be inputted to the controller 11. In this case, similar effects to those when using the playback signal amplitude values in the totality of the sectors are obtained, although the conversion gain of the difference $I \!\!\!E$ of the amplitude sum values and the deviation $\delta$ are changed.

With the present second embodiment of the magnetic disc device, the amount of deviation $\delta$ between the center of the recording head 6 and that of the playback head 7 can be correctly detected by a simplified circuit structure. Also, with the present magnetic disc device, the amount of deviation $\delta$ between the center of the recording head 6 and that of the playback head 7 can be periodically measured on power up or in the absence of, for example, recording/reproduction, for coping with changes in the amount of deviation $\delta$ with lapse of time. Stated differently, there is no necessity of measuring the amount of deviation $\delta$ at the time of manufacture, while the amount of deviation $\delta$ can be measured easily based on the amplitude of the playback signals to reduce production cost.

After calculation of the amount of deviation $\delta$ between the center of the recording head 6 and that of the playback head 7 has come to a close in this manner, the controller 11 causes this value to be stored in the memory 30. During recording/reproduction of actual data, the controller 11 corrects the position of the recording head 6 and that of the playback head 7 based on the amount of deviation $\delta$ stored in the memory 30.

That is, the controller 11 routes data corresponding to the amount of deviation $\delta$ as an offset to the D/A converter 19. The adder 20 sums the position error signal supplied from the position error detection circuit 18 to this pre-set mount of offset and sends the resulting sum signal via servo control circuit 8 to the VCM driving circuit 5.

Specifically, the positions of the recording head 6 and the playback head 7 can be corrected by a method consisting in recording data by the recording head 6 with offset given to the recording head 6 during data recording and in reproducing data without offset being given to the playback head 7, ands a method consisting in recording data by the recording head 6 without offset being given to the recording head 6 during data recording and in reproducing data with offset being given to the playback head 7. However, these methods are not explained specifically for clarity.

With the present second embodiment of the magnetic disc device, similarly to the second embodiment of the magnetic disc device, even if the center of the recording head 6 and that of the playback head 7 are deviated from each other, the recording head 6 and the playback head 7 sweep the same position on the recording track for correctly reproducing the data. If the amount of deviation $\delta$ undergoes fluctuations from one magnetic disc device to another, data can be correctly reproduced by measuring the amount of deviation $\delta$ on power up as described above for correctly reproducing the data.

Although the sinusoidal modulation data shown in the equation (1) is used in the present magnetic disc device as modulation data for wobbling the recording head 6, the modulation data of the triangular wave as shown by the above equation (2) or the modulation data of the serrated waveform as shown in the equation (3) may also be used, as in the first embodiment described above.

In the present magnetic disc apparatus, dedicated positioning marks for wobbling may be provided separately and the position error signal generated from these dedicated positioning marks may be used for positioning.

A third embodiment is now explained. In the present third embodiment, similarly to the first embodiment, the playback head 7 is wobbled at the time of reproducing the test data for computing the deviation between the center of the recording head 6 and that of the playback head 7. At this time, the playback head 7 is moved along the radius of the magnetic disc 1 from the track center 31 by an offset thought to be equivalent to the amount of deviation $\delta$. The playback head 7 is wobbled, as the above-described offset value adjustment is repeatedly performed, until the absolute difference value between the sum of the amplitudes of the playback signal in a pre-set group of sectors and the sum of the amplitudes of the playback signal in another group of sectors becomes smaller than a pre-set value. At a time point when the absolute difference value becomes smaller than the pre-set value, the above-mentioned amount of deviation $\delta$ is computed based on the offset value and on both the offset value and the above-mentioned difference value.

Since the third embodiment of the magnetic disc device is configured similarly to the first embodiment of the magnetic disc device, shown in FIG. 1, reference is had to FIG. 1 without having reference to new figures showing the configuration of the magnetic disc device.

The method for recording/reproducing the test data and the method for computing the deviation of the center of the recording head 6 from that of the playback head 7 from the amplitude values of the playback signals, in the present second embodiment of the magnetic disc device, is now explained by referring to FIG. 7.

With the playback head 7 positioned so that its center is coincident with the track center 31 by the position error detection circuit 18 and by the servo control circuit 8, the controller 11 feeds N sectors of pre-set test data, each made up of, for example, the same 512 bytes, to the encoding circuit 12. The result is that the test data are recorded by the recording head 6 on each sector from #1 to #N of the recording track 33 of the magnetic disc 1.

The center of the recording head 6 is not necessarily coincident with the center of the playback head 7, as described above. With the amount of deviation between the center of the recording head 6 and the center of the playback head 7 equal to $\delta$, the test data is recorded at a position deviated by $\delta$ from the track center 31 for forming the recording track 33.

The playback head 7 is then wobbled relative to the center of the track 31 and positioned with the above-mentioned pre-set offset from the track center 31 for reproducing the test data.

The playback head 7 is wobbled by supplying the sinusoidal modulation data to the A/D converter 19, as in the first embodiment described above. The D/A converter 19 converts the sinusoidal modulation data into modulation signals which are supplied to the adder 20 which then adds an output of the position error detection circuit 18 to the above-mentioned modulation signal.

For positioning the playback head 7 with a pre-set offset given to the track center 31, it suffices to sum the sinusoidal modulation data to a pre-set offset value and to route the resulting sum data as modulation data to the D/A converter 19.

Figure 10:
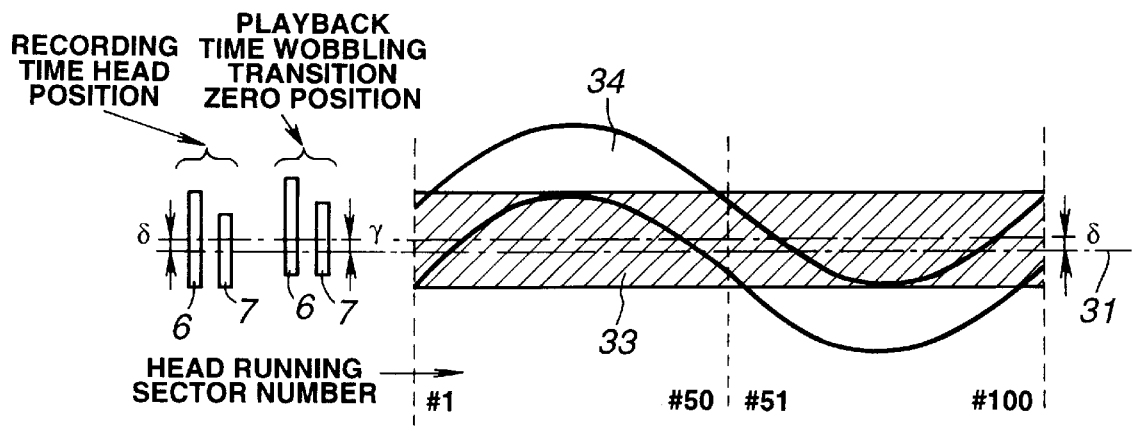
FIG. 10 shows a typical example of a trajectory of a recording head and a playback head in a third embodiment according to the present invention.

It is assumed for explanation sake that, with the number of sectors N equal to 100, the controller 11 causes the playback head 7 to be moved sinusoidally towards the (+) and (−) sides for the sectors #1 to #50 and for the sectors #51 to #100, respectively, as shown in FIG. 10.

It is first assumed that the playback head 7 is controlled to be positioned for wobbling relative to the track center 31, that is that the above-mentioned offset is equal to zero. There is produced a difference in the amplitude values of the playback signals of the test data between the corresponding sectors of the sectors #1 to #50 and the sectors #51 to #100 depending on the amount of deviation $\delta$ between the recording head 6 and the center of the playback head 7, as explained previously.

It is then assumed that, for wobbling the playback head 7 relative to the track center 31 for reproducing the test data, the playback head 7 has been set at a position for which an offset $\gamma$ equal to the amount of deviation $\delta$ has been given the track center 31. This is tantamount to giving the offset $\gamma$ equal to the amount of deviation $\delta$ to the track center 31 in the radial direction of the magnetic disc 1 for positioning the playback head 7 and subsequently wobbling the playback head 7.

Figure 11:
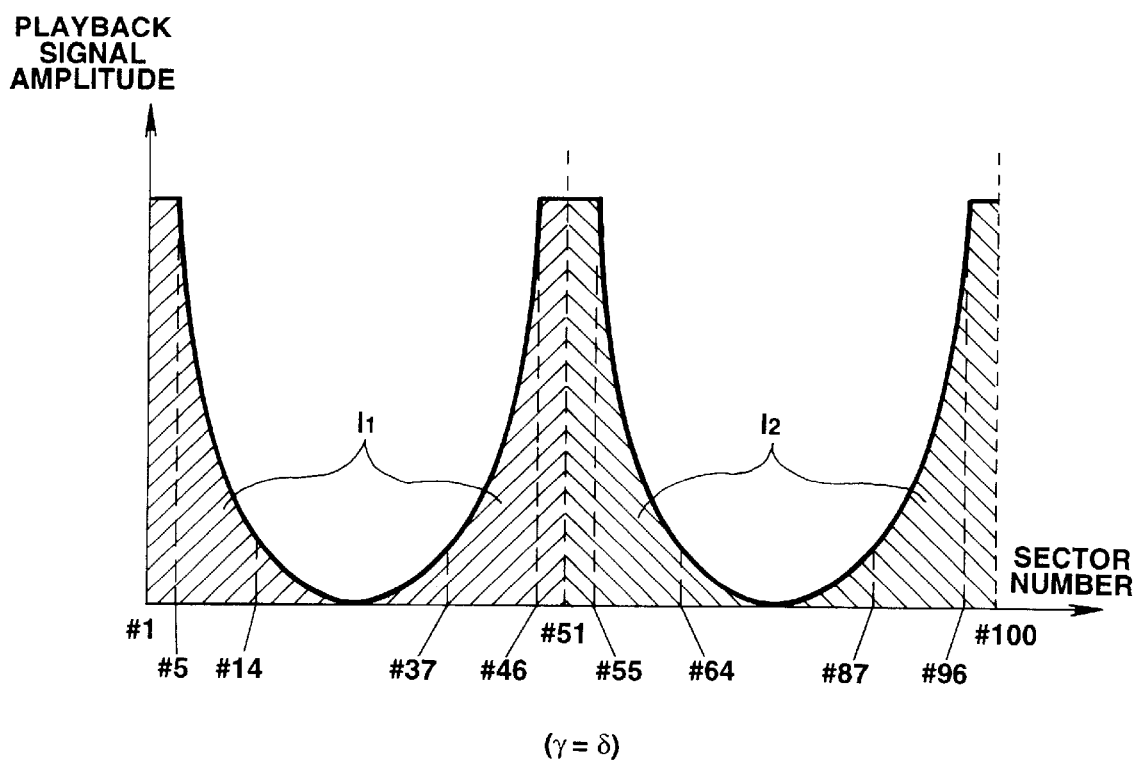
FIG. 11 is a graph showing amplitude values of playback signals of test data used in the third embodiment shown in FIG. 10.

In this case, the amplitude values of the playback signals become symmetrical for the sectors #1 to #50 and the sectors #51 to #100 as in the case the amount of deviation $\delta$ is inherently zero, as shown in FIG. 11. The fact that the amplitude values of the playback signals are symmetrical for the sectors #1 to #50 and the sectors #51 to #100 as shown in FIG. 11 is tantamount to the difference $\Delta I$ between the sum $I_1$ by the adder 51 of the playback signal amplitudes in the sectors #1 to #50 being equal to the sum $I_2$ by the adder 52 of the playback signal amplitudes in the sectors #51 to #100. Therefore, if there is obtained such an offset $\gamma$ for which the difference $\Delta I$ is equal to zero, the amount of deviation $\delta$ is found as $\delta=\gamma$.

Figure 12:
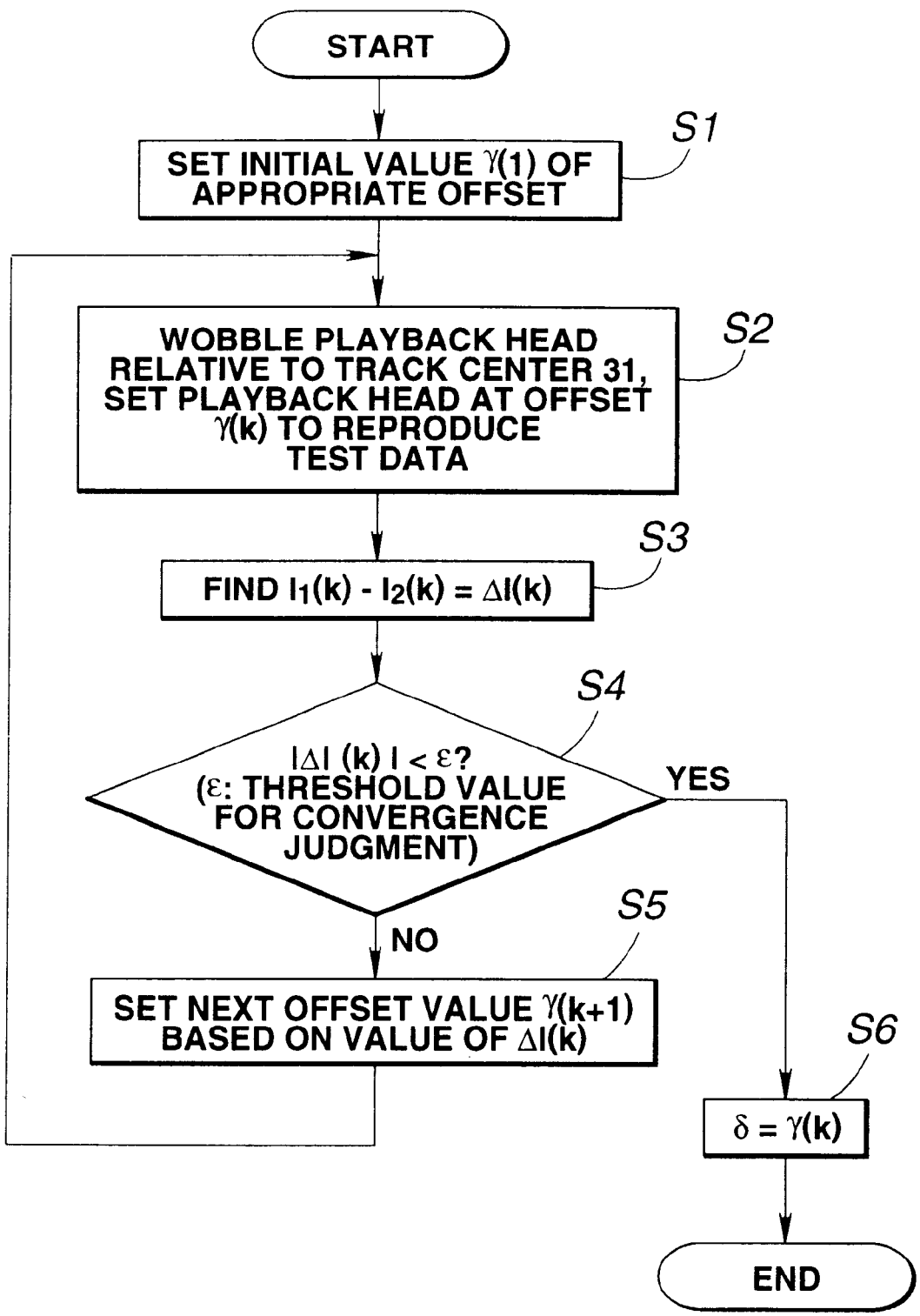
FIG. 12 is a flowchart for illustrating a typical operation for finding the deviation δ in the third embodiment shown in FIG. 10.

The specified operation for finding the above-mentioned amount of deviation $\delta$ of the present third embodiment of the magnetic head device is now explained by referring to the flowchart of FIG. 12. It is presupposed that test data has already been recorded by the recording head 6 on the recording track 33 shown in FIG. 10.

First, the controller 11 sets an appropriate initial value γ of the offset at strep S1. This may be set at a center value of the possible range of the amount of the deviation δ.

The controller 11 then sends a sum of the offset value γ(k) to the sinusoidal modulation data, where k denotes the number of trial operations of 1, 2, 3, . . . . That is, the controller 11 wobbles the playback head 7 relative to the track center 31, at the same time as it sets the playback head 7 at a position corresponding to the track center 31 plus the offset γ(k), as shown at step S2, in reproducing the test data. This is tantamount to the controller 11 setting the playback head 7 at a position corresponding to the track center 31 plus the offset γ(k) for wobbling the playback head 7 for reproducing the test data.

The controller 11 then causes the subtractor 50 to find a difference ΔI(k) between the sum $I_1(k)$ of the amplitude values of the sectors #1 to #50 and the sum $I_2(k)$ of the amplitude values of the sectors #51 to #100, which are outputs of the playback amplifier 15 detected by the playback signal amplitude detection circuit 23. The controller 11 then receives this difference ΔI(k).

The controller 11 then judges at step S4 whether or not the absolute value |ΔI(k)| of the above difference ΔI(k) is smaller than a pre-set threshold value ε for convergence judgment. The value of ε is set taking into account the measurement noise and the required degree of precision.

If the controller 11 finds that |ΔI(k)| is smaller than ε (YES), processing transfers to step S6 to judge that the offset γ(k) has become equal to the amount of deviation δ between the center of the recording head 6 and that of the playback head 7.

Conversely, if the controller 11 judges at step S4 that |ΔI(k)| is not smaller than ε (NO), processing transfers to step S5 and sets the next offset vale γ(k+1) based on the valuer of ΔI(k).

Processing then reverts to step S2. This loop is repeated until the affirmative judgment (YES) is given at step S4.

As the number of trial operations k is incremented to 1, 2, 3, . . . , the absolute value |ΔI(k)| of ΔI(k) is approached to ε. The offset γ(k), which has become smaller than ε, is termed the amount of deviation δ.

The condition for decision shown in step S4 may be meeting |ΔI(k)|<ε n times on end. The equation for computing the amount of deviation δ at step S6 may also be an average value of the offset during the period when δ=[γ(k−n−1)+. . . +γ(k)]/n and |ΔI(k)|<ε are both met.

Figure 13:
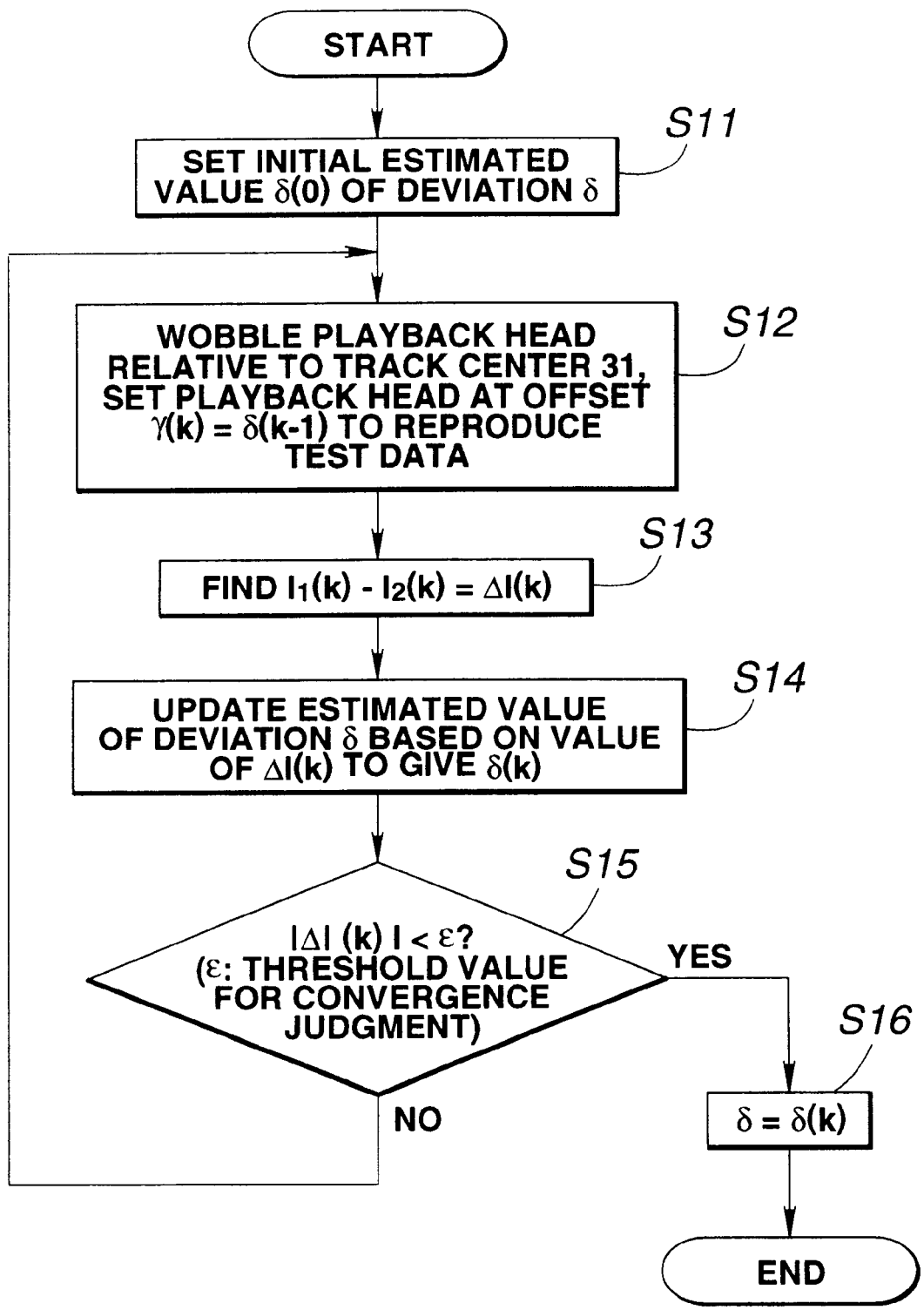
FIG. 13 is a flowchart for illustrating another typical operation for finding the deviation δ in the third embodiment shown in FIG. 10.

With the present third embodiment of the magnetic disc device, the amount of deviation δ may also be found in accordance with the flowchart shown in FIG. 13. It is presupposed that test data has already been recorded by the recording head 6 on the recording track 10 shown in FIG. 10.

The controller 11 then sends a sum of the offset value γ(k−1) to the sinusoidal modulation data, where k denotes the number of trial operations of 1, 2, 3, . . . . that is, the controller 11 wobbles the playback head 7 relative to the track center 31, at the same time as it sets the playback head 7 at a position corresponding to the track center 31 plus the offset γ(k), as shown at step S12. This is tantamount to the controller 11 setting the playback head 7 at a position corresponding to the track center 31 plus the offset γ(k−1) and wobbling the playback head 7 for reproducing the test data.

The controller 11 then causes the subtractor 50 to find at step S13 a difference ΔI(k) between the sum $I_1(k)$ pf the amplitude values of the sectors #1 to #50 and the sum $I_2(k)$ of the amplitude values of the sectors #51 to #100, which are outputs of the playback amplifier 15 detected by the playback signal amplitude detection circuit 23. The controller 11 then receives this difference ΔI(k).

The controller 11 then finds by the subtractor 50 a difference value ΔI(k) between the sum $I_1(k)$ of the amplitude values of the sectors #1 to #50 of the playback signals as an output of the playback amplifier 15 detected by the playback signal amplitude detection circuit 23 and the sum $I_2(k)$ of the amplitude values of the sectors #51 to #100. The controller 11 receives this difference value ΔI(k).

The controller 11 then updates the estimated value of the amount of deviation δ to δ(k), based on the difference value ΔI(k), as shown at step S14.

The controller 11 then judges at step S15 whether or not the absolute value |ΔI(k)| of the difference ΔI(k) is smaller than a pre-set threshold value ε used for convergence judgment, where ε is set taking the measurement noise and the required degree of precision into account.

If the controller 11 judges at step S15 that the absolute value |ΔI(k)| has become smaller than ε (YES), processing transfers to step S16 in order to give a decision that the estimated value δ(k) has become equal to the amount of deviation δ.

If the controller 11 judges at step S15 that the absolute value |ΔI(k)| is not smaller than ε (NO), processing reverts to step S12 in order to repeat this loop until the affirmative decision (YES) is given at step S15.

As the number of trial operations k is incremented to 1, 2, 3, . . . , the absolute value |ΔI(k)| of ΔI(k) is approached to ε. The estimated value δ(k), which has become smaller than ε, is termed the amount of deviation δ.

If, when the magnetic disc device is in operation in accordance with the flowchart shown in FIG. 13, it is known in advance with how many number of times of trial operations at the maximum the relation of |ΔI(k)|<ε is met, the condition of |ΔI(k)|<ε may be deemed to be met when the above-mentioned maximum number of times of trial operations is reached. That is, the maximum number of times of trial operations beings reached may be used as the condition for judgment at step S15.

Figure 14:
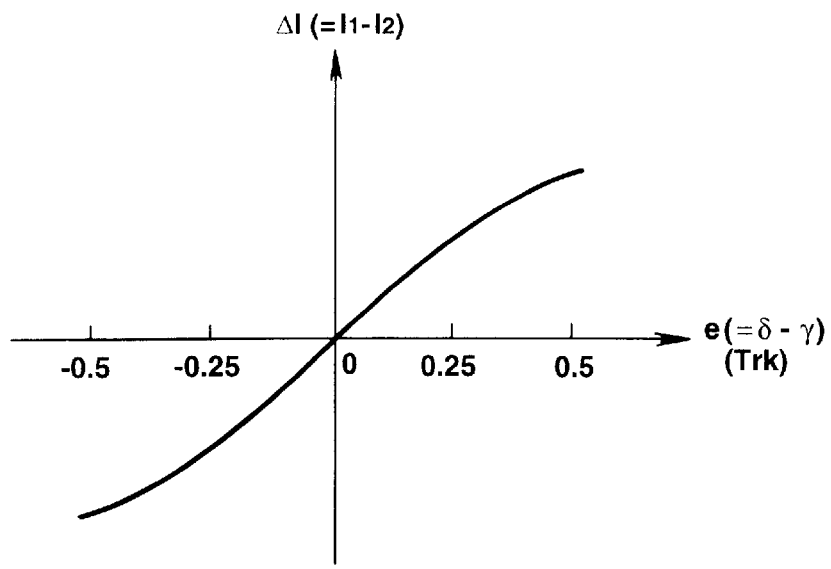
FIG. 14 is a graph showing the relation between the residual e between the deviation δ and an offset γ given in the third embodiment shown in FIG. 10.

It should be noted that various techniques may be used for setting the next amount of offset γ(k+1) at step S5 of the flowchart of FIG. 12, or updating the estimated value δ at step S14 of the flowchart of FIG. 13. The method for efficient convergence includes a method of table reference or linear approximation processing exploiting the fact that a monotonous relationship as shown in FIG. 14 holds between the amount of deviation δ, the residuals e as given and the difference ΔI of the amplitude sum values.

Specifically, an estimated value e(k) of the residuals of the offset γ as given and the amount of deviation δ may be found by table reference or linear approximation processing in order to find the updated value by $$\gamma(k+1)=\gamma(k)+e(k)$$

or $$\delta(k)=\gamma(k)+e(k)[=\delta(k-1)+e(k)].$$

With the present third embodiment of the magnetic disc device, it is also possible to provide an adder/subtractor 53 downstream of the playback signal amplitude detection circuit 23 as shown in FIG. 6 for adding and subtracting the amplitude values of the playback signals for the sectors #1 to #50 and for the sectors #51 to #100 for inputting the difference value ΔI to the controller 11.

With the above magnetic disc device, the amount of deviation δ may similarly be found by obtaining such offset γÆ for which the difference ΔIÆ between the sum value IÆ$_1$ of the amplitude values of the playback signals for the sectors #5 to #14 and for the sectors #37 to #46 totaling at 20 sectors and the sum value IÆ$_2$ of the amplitude values of the playback signals for the sectors #55 to #64 and for the sectors #87 to #96 totaling at 20 sectors will be equal to zero.

Thus it is possible with the present third embodiment of the magnetic disc device to detect the amount of deviation δ between the centers of the recording head 6 and the playback head 7 correctly by a simplified circuit configuration. Also, with the present magnetic disc device, the amount of deviation δ can be periodically measured on power up or in the absence of, for example, recording/reproduction, for coping with changes in the amount of deviation δ with lapse of time. Stated differently, there is no necessity of measuring the amount of deviation δ at the time of manufacture, while the amount of deviation δ can be measured easily based n the amplitudes of the playback signal to reduce production cost. Moreover, the production cost may be lowered.

If the measurement algorithm of converging the difference ΔI of the amplitude sum values to zero as described above is used, measurement errors in linear approximation or table used for finding the estimated value e from ΔI(k) may be progressively decreased each time a trial operation is carried out, even if such error exist, thus realizing the measurement results with high precision.

On completion of the calculations for finding the amount of deviation δ between the centers of the recording head 6 and the playback head 7, the controller 11 causes the calculated value to be stored in the memory 30. In recording/reproducing actual data, the controller 11 corrects the positions of the recording head 6 and the playback head 7 based on the value of deviation δ stored in the memory 30.

That is, the controller 11 routes data corresponding to the amount of deviation δ as an offset to the D/A converter 19. The adder 20 sums the position error signal supplied from the position error detection circuit 18 to this offset of the pre-set value to route the resulting sum via servo control circuit 8 to the VCM driving circuit 5.

Specifically, the positions of the recording head 6 and the playback head 7 can be corrected by a method consisting in recording data by the recording head 6 with offset given to the recording head 6 during data recording and in reproducing data without offset being given to the playback head 7, ands a method consisting in recording data by the recording head 6 without offset being given to the recording head 6 during data recording and in reproducing data with offset being given to the playback head 7. However, these methods are not explained specifically for clarity.

With the present second embodiment of the magnetic disc device, similarly to the second embodiment of the magnetic disc device, even if the center of the recording head 6 and that of the playback head 7 are deviated from each other, the recording head 6 and the playback head 7 sweep the same position on the recording track for correctly reproducing the data. If the amount of deviation δ undergoes fluctuations from one magnetic disc device to another, data can be correctly reproduced by measuring the amount of deviation δ on power up as described above for correctly reproducing the data.

Although the sinusoidal modulation data shown in the equation (1) is used in the present magnetic disc device as modulation data for wobbling the recording head 6, the modulation data of the triangular wave as shown by the above equation (2) or the modulation data of the serrated waveform as shown in the equation (3) may also be used, as in the first embodiment described above.

In the present magnetic disc device, dedicated marks for portioning in wobbling may be separately provided for generating position error signals used for positioning. If, in this case, an offset is given the track center 31 in positioning the playback head 7, it suffices to add a pre-set offset value to the position error signal via D/A converter 19. A fourth embodiment of the present invention, which differs from the third embodiment in the method of recording/reproducing test data, is now explained. In the third embodiment, the playback head 6 is wobbled during reproduction of test data. In the present fourth embodiment, it is the recording head 6 that is wobbled during recording the test data. That is, in the present fourth embodiment of the magnetic disc device, similarly to the above-described second embodiment, the recording head 6 is wobbled in recording the test data for computing the deviation between the centers of the recording head 6 and the playback head 7. For reproduction, the playback head 7 is radially moved away from the track center 31 of the magnetic disc 1 in an amount of offset possibly corresponding to the amount of deviation δ. Under this condition, the recording head 6 is wobbled while the adjustment of the above offset value is repeated until the absolute difference value between the sum of the amplitudes of the playback signals in a pre-set group of sectors and that in another pre-set groups of sectors becomes smaller than a pre-set value. The amount of deviation δ is computed on the basis of the above offset value alone or in combination with the above difference value prevailing at a time point when the absolute value of the difference value has become smaller than the pre-set value.

Since the present fourth embodiment of the magnetic disc device is configured similarly to the first embodiment of the magnetic disc device, shown in FIG. 1, reference is had to FIG. 1 without having reference to new figures showing the configuration of the magnetic disc device.

Figure 15:
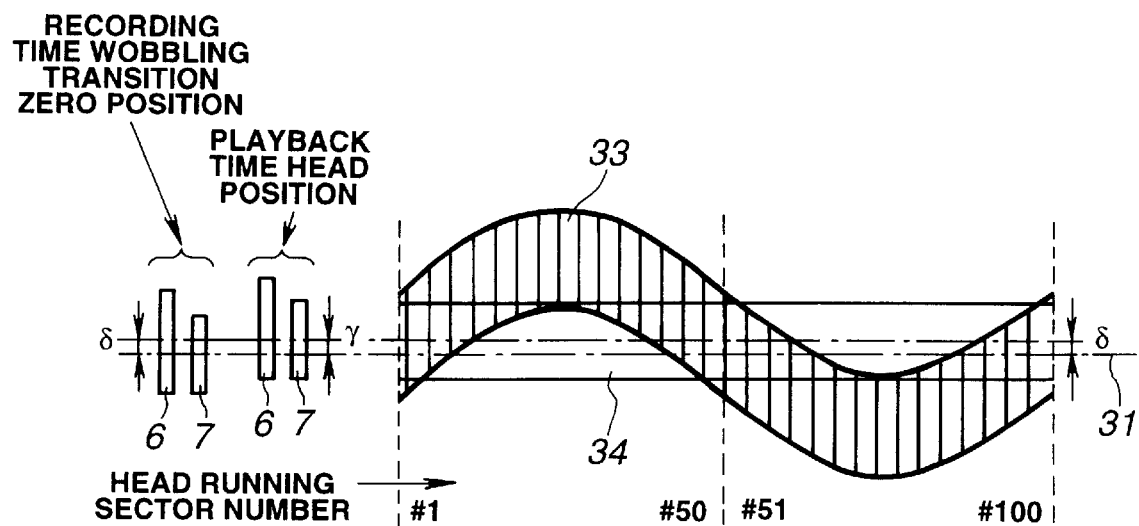
FIG. 15 shows a typical example of a trajectory of a recording head and a playback head in a fourth embodiment according to the present invention.

Referring to FIG. 15, the method for recording/reproducing test data and the method for computing the deviation between the centers of the recording head 6 and the playback head 7 in the magnetic disc device according to the present fourth embodiment will now be explained in detail.

With the playback head 7 positioned so that its center is coincident with the track center 31, the controller 11 feeds N sectors of pre-set test data, made up of, for example, the same 512 bytes, to the encoding circuit 12. The result is that the test data are recorded by the recording head 6 on each sector from #1 to #N of the recording track 33 pf the magnetic disc 1, as shown in FIG. 15. That is, the test data are recorded by being wobbled about a position deviated by the amount of deviation δ between the center of the recording head 6 and the center of the playback head 7 for forming the recording track 33.

The recording head 6 is wobbled by supplying the sinusoidal modulation data to the D/A converter 19 as explained in the above-described first embodiment. The D/A converter 19 converts the sinusoidal modulation data into modulation signals which are routed to the adder 20. The adder 20 sums the modulation signal from the D/A modulator 19 to the position error signal supplied from the position error detection circuit 18 and routes the resulting sum signal via servo control circuit 8 to the VCM driving circuit 5. The result is that the recording head 6 is run with a radial sinusoidal transition about the track center 31 as center for forming the meandering recording track 33 on the magnetic disc 1.

It is assumed that, with the number of sectors N equal to 100, the controller 11 has caused the recording head 6 to be moved sinusoidally during recording towards the (+) side for the sectors #1 to #50 and towards the (−) side for the sectors #51 to #100, as shown in FIG. 15.

Figure 8B:
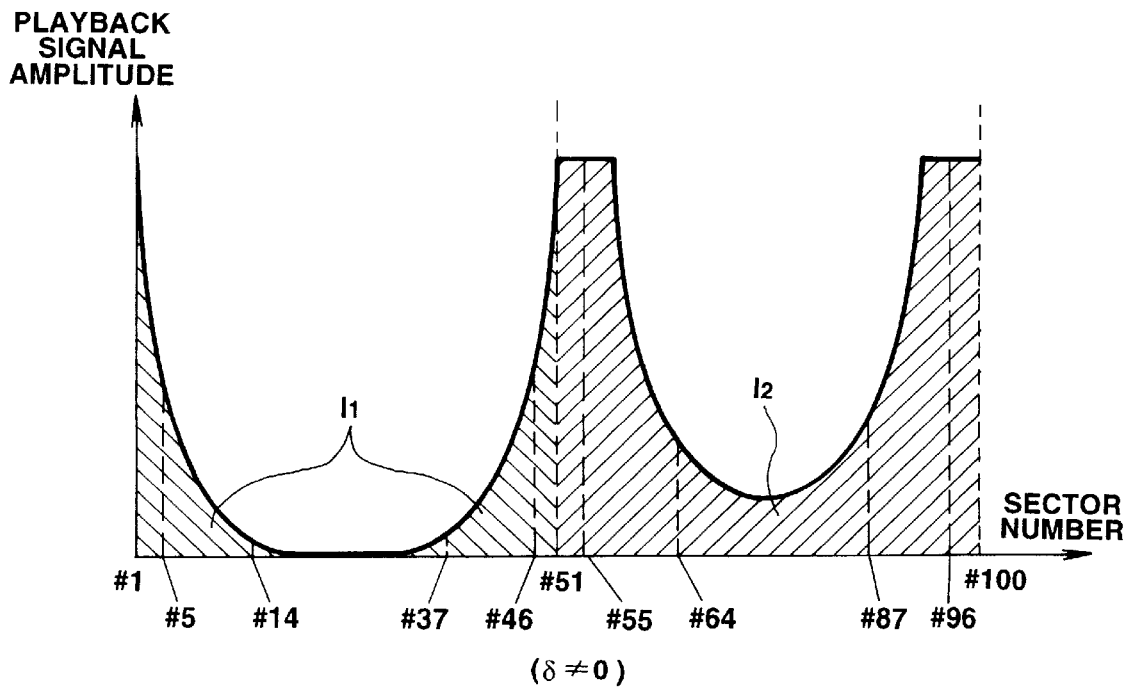

It is first assumed that the playback head 7 is controlled to be positioned into coincidence with the track center 31, that is that the above-mentioned offset is equal to zero. There is produced a difference in the amplitude values of the playback signals of the test data between the corresponding sectors of the sectors #1 to #50 and the sectors #51 to #100 depending on the amount of deviation δ between the recording head 6 and the center of the playback head 7, as explained previously with reference to FIG. 8(B).

It is then assumed that the playback head 7 has been positioned with an offset γ equal to the amount of deviation δ given to the track center 31 as shown in FIG. 15. The amplitude values of the playback signals become symmetrical between the tracks #1 to #50 and the tracks #51 to #100, as in the case where the amount of deviation δ is inherently equal to zero, as shown in FIG. 16.

Figure 16:
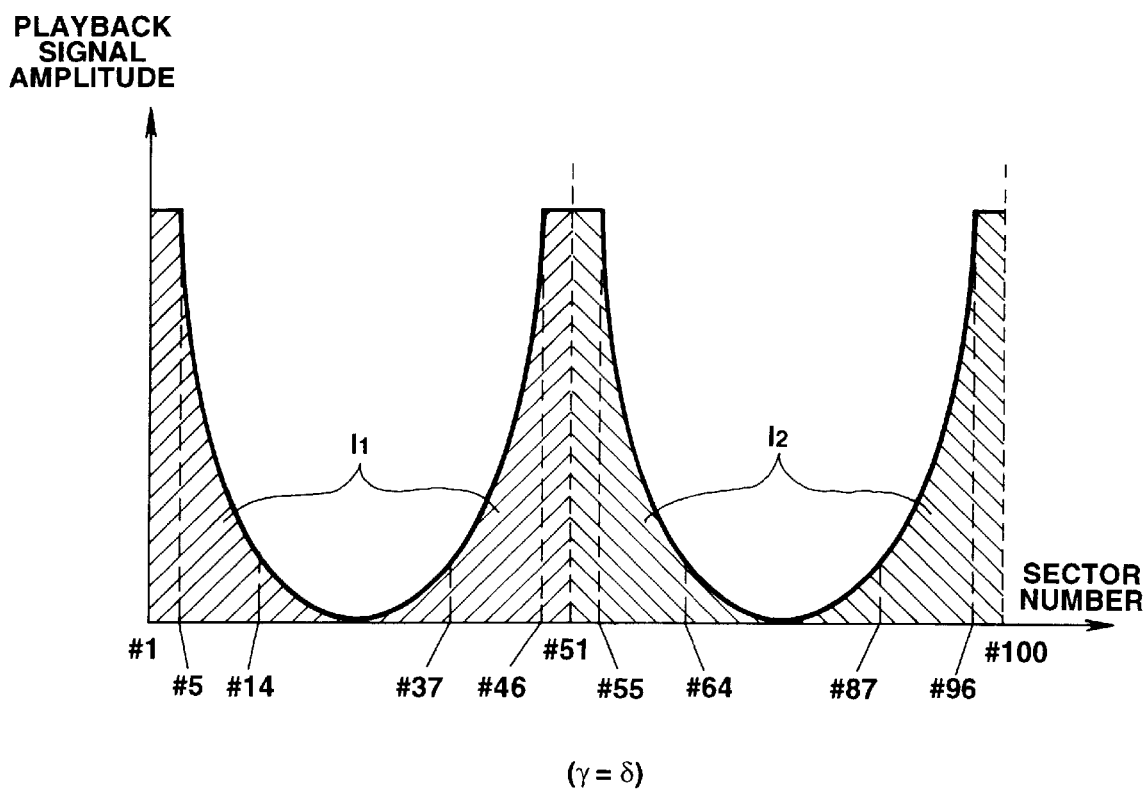
FIG. 16 is a graph showing amplitude values of playback signals of test data used in the fourth embodiment shown in FIG. 15.

The amplitude values of the playback signals being symmetrical between the tracks #1 to #50 and the tracks #51 to #100 as shown in FIG. 16 means the same thing as the difference ΔI between the sum $I_1$ by the adder 51 of the playback signal amplitudes in the sectors #1 to #50 and the sum $I_2$ by the adder 52 of the playback signal amplitudes in the sectors #51 to #100 being zero. Thus, if such offset γ as gives the difference I equal to zero is obtained, the amount of deviation δ may be found as δ=γ.

Figure 17:
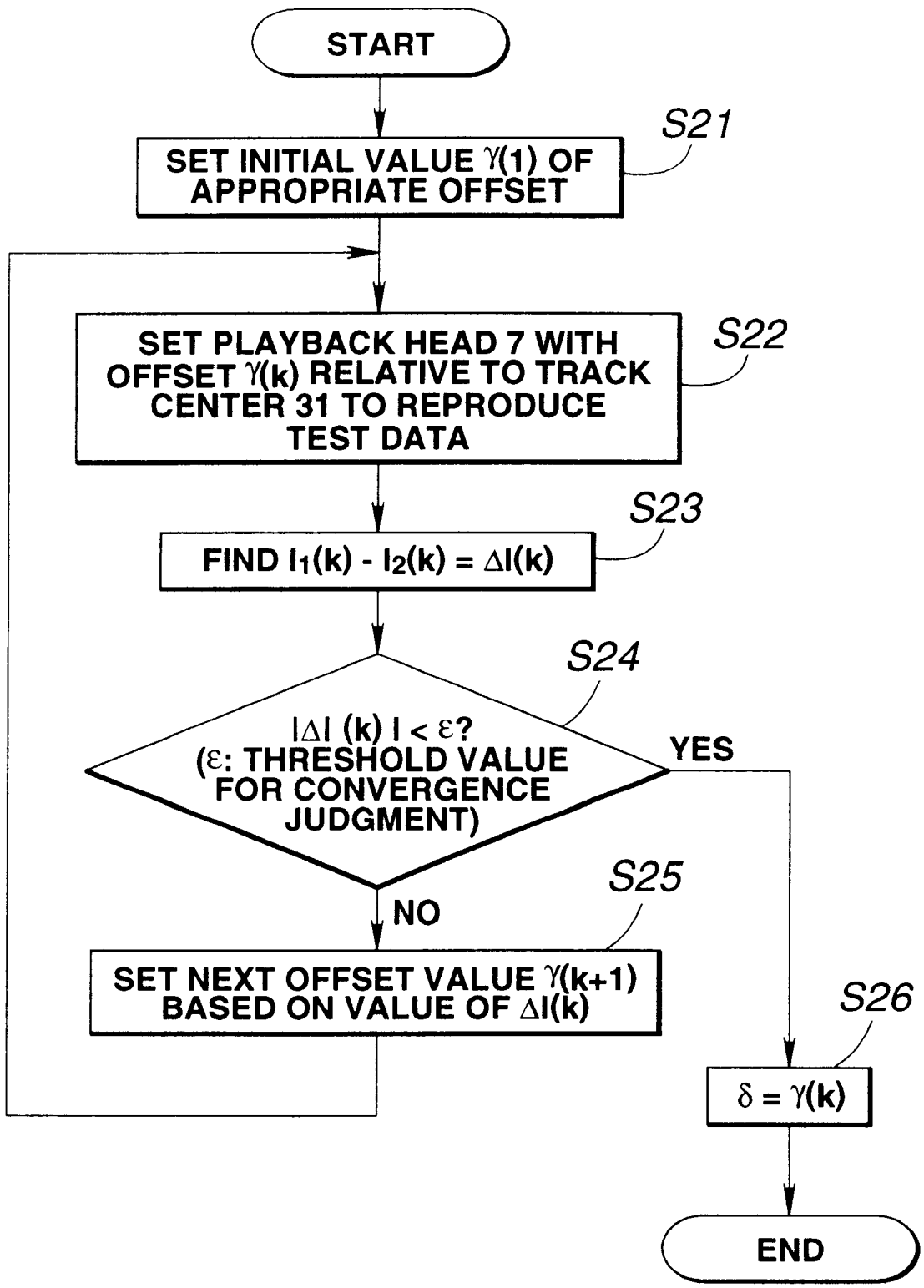
FIG. 17 is a flowchart for illustrating an operation carried out for finding the deviation δ in the fourth embodiment shown in FIG. 15.

Referring to the flowchart of FIG. 17, an illustrative operation of finding the above amount of deviation δ in the present fourth embodiment of the present invention is explained. It is assumed that test data has already been recorded by the recording head 6 on the recording data 33 shown in FIG. 15.

The controller 11 first sets an appropriate initial value of the offset γ(1) as shown at step S21. It suffices to set the initial value γ(1) as a mid value of an estimated range of the amount of deviation δ.

The controller 11 then routes a sum of the sinusoidal modulation data and an offset γ(k), where k denotes the number of times of the operations carried out and denotes 1, 2, 3, . . . , as modulation data to the D/A modulator 19. The modulation signal from the D/A modulator 19 is summed by the adder 20 to the position error signal from the position error signal 18. That is, the controller 11 causes test data to be reproduced with the playback head 7 positioned with an offset γ(k) with respect to the track center 31, as shown at step S2.

The controller 11 then causes the subtractor 50 to find the difference ΔI(k) between the sums $I_1$k and $I_2$(k) of the of the sectors #1 to #50 and the sectors #51 to #100 of the playback signals as outputs of the playback amplifier 15 as detected by the playback signal amplitude detection circuit 23, as shown at step S23. The controller 11 receives this difference ΔI(k).

The controller 11 then judges, at step S24, whether or not the absolute value |ΔI(k)| of the difference ΔI(k) is smaller than a pre-set threshold value e for convergence judgment. The value of the threshold value ε is set taking the noise in measurement and the required precision into account.

If the controller 11 judges at step S24 that the absolute value |ΔI(k)| has become smaller than ε (YES), processing transfers to step S26 in order to give a decision that the offset value γ(k) has become equal to the amount of deviation δ between the centers of the recording head 6 and the playback head 7.

If the controller 11 judges that the absolute value |ΔI(k)| has not become smaller than ε (NO), processing transfers to S25 for setting the next offset value γ(k+1) based on the value of I(k). Processing then reverts to step S22. The above-described sequence of operations is repeated until the affirmative decision (YES) is issued at step S24.

As the number of trial operations k is incremented to 1, 2, 3, . . . , the absolute value |ΔI(k)| of ΔI(k) is approached to ε. The estimated value δ(k), which has become smaller than ε, is termed the amount of deviation δ.

The relation |I(k)|<ε being met n times on end may also be used as a decision condition shown at step S24. The formula for computing the amount of deviation δ at step S26 may be an average value of the offset during the time period when δ=[γ(k−n+1)+. . . γ(k)]/n and |ΔI(k)|<ε are both met.

Figure 18:
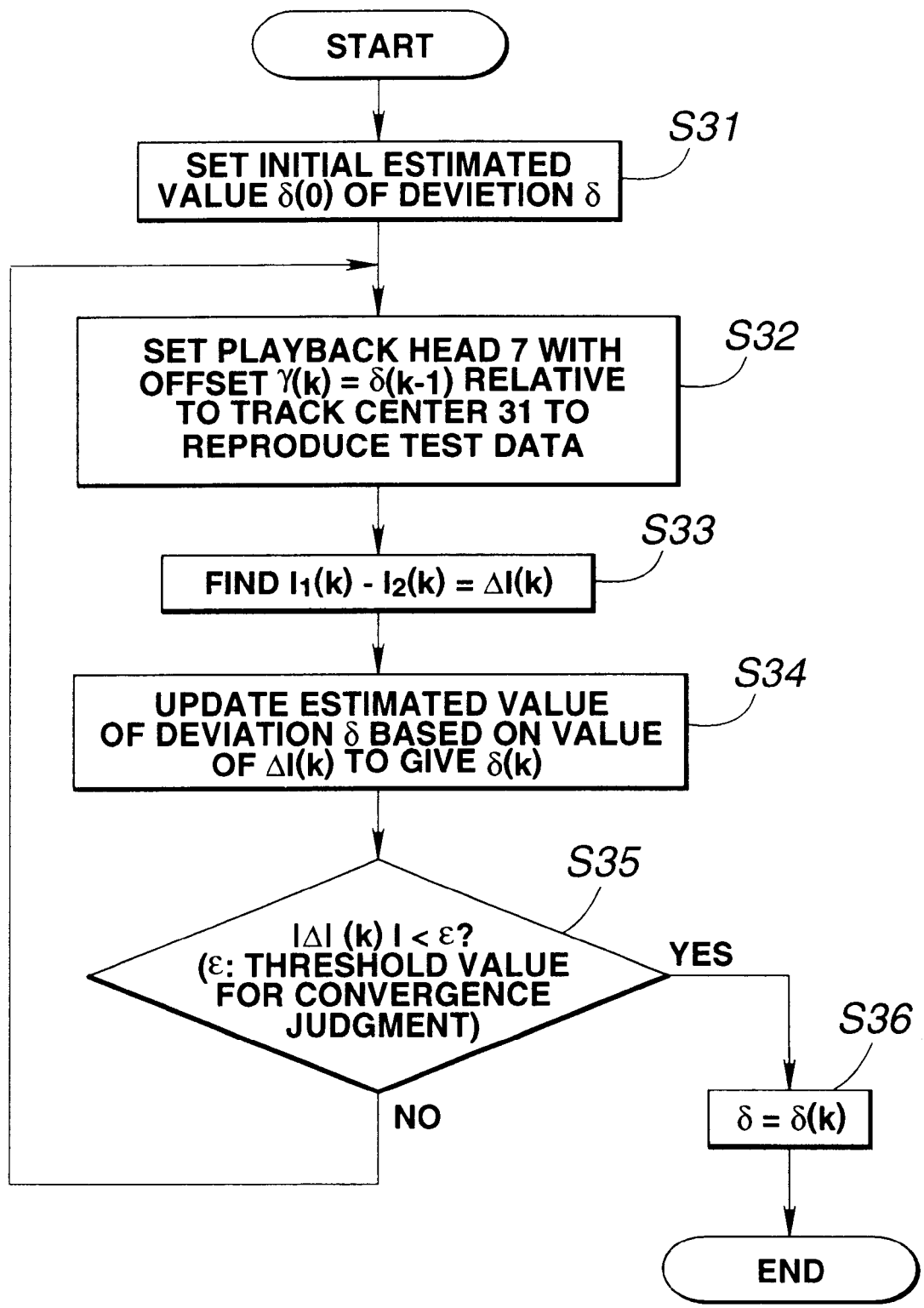
FIG. 18 is a flowchart for illustrating another operation carried out for finding the deviation δ in the fourth embodiment shown in FIG. 15.

It is also possible for the present fourth embodiment of the magnetic disc device to find the amount of deviation δ in accordance with the flowchart shown in FIG. 18. It is presupposed here again that test data is previously recorded by the recording head 6 on the recording track 33 shown in FIG. 15.

The controller 11 first sets an initial value δ(0) of the amount of deviation δ as shown at step S31. It suffices to set the initial value γ(1) as a mid value of an estimated range of the amount of deviation δ.

The controller 11 then routes a sum of the sinusoidal modulation data and an offset γ(k)=δ(k−1), where k denotes the number of times of the operations carried out and denotes 1, 2, 3, . . . , as modulation data to the D/A modulator 19. The modulation signal from the D/A modulator 19 is summed by the adder 20 to the position error signal from the position error signal 18. That is, the controller 11 causes test data to be reproduced, with the playback head 7 positioned with an offset γ(k)=δ(k−1), as shown at step S32.

The controller 11 then causes the subtractor 50 to find the difference ΔI(k) between the sums $I_1$k and $I_2$(k) of the of the sectors #1 to #50 and the sectors #51 to #100 of the playback signals as outputs of the playback amplifier 15 as detected by the playback signal amplitude detection circuit 23, as shown at step S33. The controller 11 receives this difference ΔI(k).

The controller 11 then updates the estimated value of the amount of deviation δ to produce an updated value δ(k) based on the difference value ΔI(k), as shown at step S34.

The controller 11 then judges, at step S35, whether or not the absolute value |ΔI(k)| of the difference ΔI(k) is smaller than a pre-set threshold value ε for convergence judgment. The value of the threshold value ε is set taking the noise in measurement and the required precision into account.

If the controller 11 judges that the absolute value |ΔI(k)| has become smaller than ε (YES), processing transfers to step S36 in order to give a decision that the estimated value δ(k) has become equal to the amount of deviation δ.

If the controller 11 judges that the absolute value |ΔI(k)| has not become smaller than ε (NO), processing reverts to step S32 to repeat the above-described sequence of operations until the affirmative decision (YES) is issued at step S35.

As the number of trial operations k is incremented to 1, 2, 3, . . . , the absolute value |ΔI(k)| of ΔI(k) is approached to ε. The estimated value δ(k), which has become smaller than ε, is termed the amount of deviation δ.

If, when the magnetic disc device is in operation in accordance with the flowchart shown in FIG. 18, it is known in advance with how many number of times of trial operations at the maximum the relation of |ΔI(k)|<ε of step S35 is met, the condition of |ΔI(k)|<ε may be deemed to be met when the above-mentioned maximum number of times of trial operations is reached. That is, the maximum number of times of trial operations beings reached may be used as the condition for judgment at step S35.

It should be noted that various techniques may be used for setting the next amount of offset γ(k+1) at step S25 of the flowchart of FIG. 17, or updating the estimated value δ at step S34 of the flowchart of FIG. 18. The method for efficient convergence includes a method of table reference or linear approximation processing exploiting the fact that a monotonous relationship as shown in FIG. 14 holds between the amount of deviation δ, the residuals e as given and the difference ΔI of the amplitude sum values.

Specifically, an estimated value e(k) of the residuals of the offset γ as give and the amount of deviation δ may be found from the difference ΔI(k) of the sums of the amplitude values by table reference or linear approximation processing in order to find the updated value by $$\gamma(k+1)=\gamma(k)+e(k)$$

or $$\delta(k)=\gamma(k)+e(k)[=\delta(k-1)+e(k)].$$

With the present fourth embodiment of the magnetic disc device, it is also possible to provide an adder/subtractor 53 downstream of the playback signal amplitude detection circuit 23 as shown in FIG. 6 for adding and subtracting the amplitude values of the playback signals for the sectors #1 to #50 and for the sectors #51 to #100, respectively, for inputting the difference value ΔI to the controller 11.

With the above magnetic disc device, the amount of deviation δ may similarly be found by obtaining such offset γÆ for which the difference ΔIÆ between the sum value IÆ$_1$ of the amplitude values of the playback signals for the sectors #5 to #14 and for the sectors #37 to #46 totaling at 20 sectors and the sum value IÆ$_2$ of the amplitude values of the playback signals for the sectors #55 to #64 and for the sectors #87 to #96 totaling at 20 sectors will be equal to zero.

Thus it is possible with the present third embodiment of the magnetic disc device to detect the amount of deviation δ between the centers of the recording head 6 and the playback head 7 correctly by simplified circuit configuration. Also, with the present magnetic disc device, the amount of deviation δ can be periodically measured on power up or in the absence of, for example, recording/reproduction, for coping with changes in the amount of deviation δ with lapse of time. Stated differently, there is no necessity of measuring the amount of deviation δ at the time of manufacture, while the amount of deviation δ can be measured easily to reduce: production cost. Moreover, the production cost may be lowered.

By using the measurement algorithm of converging the difference ΔI of the amplitude sum values to zero as described above, measurement errors in linear approximation or table used for finding the estimated value e(k) from ΔI(k) may be progressively decreased each time a trial operation is carried out, even if such errors exist, thus realizing the measurement results with high precision.

On completion of the calculations for finding the amount of deviation δ between the centers of the recording head 6 and the playback head 7, the controller 11 causes the calculated value to be stored in the memory 30. In recording/reproducing actual data, the controller 11 corrects the positions of the recording head 6 and the playback head 7 based on the value of deviation δ stored in the memory 30.

That is, the controller 11 routes data corresponding to the amount of deviation δ as an offset t the D/A converter 19. The adder 20 sums the position error signal supplied from the position error detection circuit 18 to this offset of the pre-set value to route the resulting sum via servo control circuit 8 to the VCM driving circuit 5.

Specifically, the positions of the recording head 6 and the playback head 7 can be corrected by a method consisting in recording data by the recording head 6 with offset given to the recording head 6 during data recording and in reproducing data without offset being given to the playback head 7, ands a method consisting in recording data by the recoding head 6 without offset being given to the recording head 6 during data recording and in reproducing data with offset being given to the playback head 7. However, these methods are not explained specifically for clarity.

With the present fourth embodiment of the magnetic disc device, similarly to the first embodiment of the magnetic disc device, even if the center of the recording head 6 and that of the playback head 7 are deviated from each other, the recording head 6 and the playback head 7 sweep the same position on the recording track for correctly reproducing the data. If the amount of deviation δ undergoes fluctuations from one magnetic disc device to another, data can be correctly reproduced by measuring the amount of deviation δ on power up as described above for correctly reproducing the data.

Although the sinusoidal modulation data shown in the equation (1) is used in the present magnetic disc device as modulation data for wobbling the recording head 6, the modulation data of the triangular wave as shown by the above equation (2) or the modulation data of the serrated waveform as shown in the equation (3) may also be used, as in the first embodiment described above.

In the present magnetic disc device, dedicated marks for positioning in wobbling may be separately provided for generating position error signals used for positioning.

The present invention is not limited to the above-described several illustrative embodiments. For example, the present invention may naturally be applied to a magneto-optical disc device in which a magneto-optical disc is used as a disc-shaped recording medium and a so-called two-beam optical head is used as an optical head.

What is claimed is:

1. A head deviation measurement method, comprising the steps of:

recording test data by a recording head on a disc-shaped recording medium;

reproducing said test data by a playback head from said disc-shaped recording medium at the same time as said playback head is wobbled along the radius of said disc-shaped recording medium; and detecting a deviation between said recording head and the playback head based on a difference between a first sum of amplitudes of a first group of sectors of playback signals corresponding to the reproduced test data and a second sum of amplitudes of a second group of sectors different from said first group of said playback signals, wherein the recording head and the playback head are separate heads formed to move together.

2. A head deviation measurement method, comprising the steps of:

recording test data by a recording head on a disc-shaped recording medium;

reproducing the test data by a playback head at the same time as the playback head is wobbled with respect to a position on a track of said disc-shaped recording medium offset by a pre-set distance from the center position of said track;

computing a difference between a first sum of amplitudes of a first group of sectors of playback signals corresponding to the reproduced test data and a second sum of amplitudes of a second group of sectors different from said first group of said playback signals;

reproducing the test data and computing said difference at the same time as said playback head is wobbled relative to a position on said track offset by an offset value updated based on a directly previous difference value with respect to the center position of said track, until an absolute value of said difference becomes smaller than a pre-set value; and repeating the process of reproducing the test data and computing said difference for detecting the amount of deviation between the recording head and the playback head, wherein the recording head and the playback head are separate heads formed to move together.

3. A data recording/reproducing method, comprising the steps of:

recording test data by a recording head on a disc-shaped recording medium prior to recording or reproducing actual data; reproducing test data by a playback head from said disc-shaped recording medium at the same time as said playback head is wobbled along the radius of said disc-shaped recording medium;

detecting a deviation between said recording head and the playback head based on a difference between a first sum of amplitudes of a first group of sectors of playback signals corresponding to the reproduced test data and a second sum of amplitudes of a second group of sectors different from said first group of said playback signals; and correcting a position of said recording head or the playback head along the radius of the disc-shaped recording medium at the time of recording or reproducing the actual data based on the detected amount of deviation, wherein the recording head and the playback head are separate heads formed to move together.

4. A head deviation measurement method, comprising the steps of:

recording test data by a recording head on a disc-shaped recording medium prior to recording or reproducing actual data;

reproducing the test data by a playback head at the same time as the playback head is wobbled with respect to a position on a track of said disc-shaped recording medium offset by a pre-set distance from the center position of said track;

computing a difference between a first sum of amplitudes of a first group of sectors of playback signals corresponding to the reproduced test data and a second sum of amplitudes of a second group of sectors different from said first group of said playback signals;

repeatedly reproducing said test data and computing said difference at the same time as said playback head is wobbled relative to a position on said track offset with respect to the center position of said track by an offset distance updated based on a directly previous difference value, until an absolute value of said difference becomes smaller than a pre-set value, for detecting the amount of deviation between the recording head and the playback head; and correcting a position of said recording head or the playback head along the radius of the disc-shaped recording medium based on the detected amount of deviation at the time of recording or reproducing the actual data, wherein the recording head and the playback head are separate heads formed to move together.

5. A head deviation measurement apparatus, comprising:

a recording head for recording test data on a disc-shaped recording medium;

a playback head wobbled along the radius of said disc-shaped recording medium for reproducing said test data from said disc-shaped recording medium; and head deviation detection means for detecting a deviation between the recording head and the playback head based on a difference between a first sum of amplitudes of a first group of sectors of playback signals corresponding to the reproduced test data and a second sum of amplitudes of a second group of sectors different from said first group of said playback signals, wherein the recording head and the playback head are separate heads formed to move together.

6. The head deviation detection apparatus as claimed in claim 5, wherein said head deviation detection means comprises:

amplitude detection means for detecting the amplitude of playback signals corresponding to the test data reproduced by said playback head;

difference computing means for computing a difference between a first sum of amplitudes of a first group of sectors of playback signals and a second sum of amplitudes of a second group of sectors different from said first group of said playback signals, said amplitudes having been detected by said amplitude detection means; and deviation computing means for computing an amount of deviation between the recording head and the playback head based on said difference from said difference computing means.

7. A head deviation measurement apparatus, comprising:

a recording head wobbled along the radius of a disc-shaped recording medium for recording test data thereon;

a playback head for reproducing said test data at the same time as it is wobbled with respect to a position on a track of said recording medium offset by a pre-set offset distance from the center of said track; and means for detecting an amount of deviation between the recording head and the playback head by repeatedly reproducing the test data and computing the difference at the same time as said playback head is wobbled relative to a position on said track offset by an offset distance updated based on a directly previous difference value with respect to the center of said track, until an absolute value of said difference becomes smaller than a pre-set value, wherein the recording head and the playback head are separate heads formed to move together.

8. The head deviation measurement apparatus as claimed in claim 7, wherein said means for detecting the amount of deviation comprises:

amplitude detection means for detecting the amplitude of playback signals corresponding to the test data reproduced by said playback head;

difference computing means for computing a difference between a first sum of amplitudes of a first group of sectors and a second sum of amplitudes of a second group of sectors different from said first group of said playback signals, said amplitudes having been detected by said amplitude detection means; and control means for repeatedly reproducing the test data and computing the difference at the same time as said playback head is wobbled relative to a position on said track offset by an offset distance updated based on a directly previous difference value with respect to the center position of said track, until an absolute value of said difference becomes smaller than a pre-set value.

9. A data recording/reproducing apparatus, comprising:

a recording head for recording data on a disc-shaped recording medium;

a playback head for reproducing data from said disc-shaped recording medium;

wobbling means for wobbling said playback head along a radius of said disc-shaped recording medium; and correction means for correcting a position of said recording head or said playback head along the radius of the disc-shaped recording medium, at the time of recording/reproducing the actual data, based on a detected amount of said deviation by recording test data on said disc-shaped recording medium or reproducing said test data from said disc-shaped recording medium as the playback head is wobbled by said wobbling means, the recording/reproduction of said test data performed prior to recording/reproduction of actual data, and detecting an amount of deviation between the recording head and the playback head based on a difference between a first sum of amplitudes of a first group of sectors of playback signals corresponding to the reproduced test data and a second sum of amplitudes of a second group of sectors different from said first group of said playback signals, wherein the recording head and the playback head are separate heads formed to move together.

10. The data recording/reproducing apparatus as claimed in claim 9, wherein said correction means comprises:

amplitude detection means for detecting the amplitude of playback signals corresponding to the test data reproduced by said playback head;

difference computing means for computing a difference between a first sum of amplitudes of a first group of sectors and a second sum of amplitudes of a second group of sectors different from said first group of said playback signals, said amplitudes having been detected by said amplitude detection means; and control means for computing an amount of deviation between the recording head and the playback head based on said difference value from said difference computing means.

11. The data recording/reproducing apparatus as claimed in claim 9, further comprising:

offset means for applying pre-set offset with respect to the center of a track on the disc-shaped recording medium for varying the position of said playback head, wherein said correction means causes said playback head to be wobbled about a position on a track offset from the center position of the track by an offset distance updated based on a directly previous difference, and said correction means causes the reproduction of the test data and calculation of the difference to be repeated for detecting the deviation between the recording head and the playback head for correcting the position of said recording head or the playback head at the time of recording/reproducing actual data based on a detected amount of said deviation.

12. The data recording/reproducing apparatus as claimed in claim 11, wherein said correction means comprises:

amplitude detection means for detecting the amplitude of playback signals corresponding to the test data reproduced by said playback head;

difference computing means for computing a difference between a first sum of amplitudes of a first group of sectors and a second sum of amplitudes of a second group of sectors different from said first group of said playback signals, said amplitudes having been detected by said amplitude detection means; and control means operative to wobble said playback head about a position on a track offset from the center position of the track by an offset value updated based on a directly previous difference, wherein said correction means causes the reproduction of the test data and calculation of the difference to be repeated.

* * * * *